US011936429B2

(12) United States Patent
Ito et al.

(10) Patent No.: US 11,936,429 B2
(45) Date of Patent: Mar. 19, 2024

(54) WIRELESS TRANSMITTING SYSTEM, WIRELESS RECEIVING SYSTEM, BASE STATION APPARATUS, WIRELESS COMMUNICATION SYSTEM, WIRELESS TRANSMITTING METHOD, AND WIRELESS RECEIVING METHOD

(71) Applicant: NIPPON TELEGRAPH AND TELEPHONE CORPORATION, Tokyo (JP)

(72) Inventors: Kota Ito, Musashino (JP); Mizuki Suga, Musashino (JP); Yushi Shirato, Musashino (JP); Naoki Kita, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 23 days.

(21) Appl. No.: 17/775,718

(22) PCT Filed: Nov. 25, 2019

(86) PCT No.: PCT/JP2019/045988
§ 371 (c)(1),
(2) Date: May 10, 2022

(87) PCT Pub. No.: WO2021/106041
PCT Pub. Date: Jun. 3, 2021

(65) Prior Publication Data
US 2022/0385368 A1 Dec. 1, 2022

(51) Int. Cl.
*H04J 14/02* (2006.01)
*H04B 10/2575* (2013.01)
*H04B 7/06* (2006.01)

(52) U.S. Cl.
CPC . *H04B 10/25753* (2013.01); *H04B 10/25759* (2013.01); *H04B 7/06* (2013.01);
(Continued)

(58) Field of Classification Search
CPC ........ H04B 10/25753; H04B 10/25759; H04B 7/06; H04B 7/0617; H04B 10/2575; H04J 14/0282; H04J 14/02
(Continued)

(56) References Cited

U.S. PATENT DOCUMENTS 6,348,890 B1 * 2/2002 Stephens .............. H01Q 3/2676
342/375
7,084,811 B1 * 8/2006 Yap ...................... H01Q 3/2676
342/373
(Continued)

FOREIGN PATENT DOCUMENTS

JP 4246724 B2 4/2009

OTHER PUBLICATIONS

Jeong et al., Design and Analysis of Swapped Port Coupler and Its Application in a Miniaturized Butler Matrix, Apr. 2010, IEEE, Transactions On Microwave Theory and Techniques, vol. 58, No. 4, All Document. (Year: 2010).*
(Continued)

*Primary Examiner* — Dibson J Sanchez
(74) *Attorney, Agent, or Firm* — Harness, Dickey & Pierce, P.L.C.

(57) ABSTRACT

An accommodation station transmission unit modulates light based on an RF signal to generate an optical signal and outputs the generated optical signal, a base station transmission unit demultiplexes the output optical signal for each of wavelengths, outputs the demultiplexed optical signals, converts the demultiplexed optical signals into electrical signals to demodulate the RF signal, outputs the demodulated RF signal, and each of first ports of a matrix operation unit including the plurality of first ports and a plurality of second ports and configured to use each of the first ports as a reference port and perform, on signals obtained by the reference ports, a BFN matrix operation of performing phase changes that are different for each of positions of the reference ports and cause each of phases of signals output from the plurality of second ports to have a linear inclination receives the demodulated RF signal and forms transmission beams in different directions for each of wavelengths by a plurality of transmission antennas emitting the RF signal output by each of the second ports of the matrix operation unit.

5 Claims, 21 Drawing Sheets

(52) U.S. Cl.
CPC ........ *H04B 7/0617* (2013.01); *H04B 10/2575* (2013.01); *H04J 14/02* (2013.01)

(58) Field of Classification Search
USPC .................................. 398/43–103, 115–117
See application file for complete search history.

(56) References Cited

U.S. PATENT DOCUMENTS

| | | | |
|---|---|---|---|
| 8,400,355 B1* | 3/2013 | Gaeta | H01Q 3/2682 342/368 |
| 10,312,999 B2* | 6/2019 | Neuman | H04B 10/118 |
| 2003/0068123 A1* | 4/2003 | Tei | G02B 6/29367 385/24 |
| 2005/0088339 A1* | 4/2005 | Yap | H01Q 3/2676 342/375 |
| 2012/0140780 A1* | 6/2012 | Chang | H04B 7/18517 398/43 |
| 2014/0320346 A1* | 10/2014 | Caille | G02B 6/29386 385/24 |
| 2017/0093495 A1* | 3/2017 | Lozhkin | H04B 10/25753 |
| 2018/0332372 A1* | 11/2018 | Liu | H04B 10/25754 |
| 2019/0020109 A1* | 1/2019 | Puleri | H01Q 3/2676 |
| 2019/0157757 A1* | 5/2019 | Murakowski | H01Q 21/0025 |
| 2020/0112378 A1* | 4/2020 | Holzheimer | H04B 7/0617 |
| 2020/0365988 A1* | 11/2020 | Bourderionnet | H04B 10/2575 |

OTHER PUBLICATIONS

Dennis T. K. Tong and Ming C. Wu, A Novel Multiwavelength Optically Controlled Phased Array Antenna with a Programmable Dispersion Matrix, IEEE Photonics Technology Letters, vol. 8, No. 6, 1996, pp. 812-814.

Qi Luo et al., Low-cost Smart Antennas, John Wiley & Sons, Ltd., Mar. 18, 2019.

* cited by examiner

WIRELESS TRANSMITTING SYSTEM, WIRELESS RECEIVING SYSTEM, BASE STATION APPARATUS, WIRELESS COMMUNICATION SYSTEM, WIRELESS TRANSMITTING METHOD, AND WIRELESS RECEIVING METHOD

CROSS-REFERENCE TO RELATED APPLICATIONS

This application is a 371 U.S. National Phase of International Application No. PCT/JP2019/045988, filed on Nov. 25, 2019. The entire disclosure of the above application is incorporated herein by reference.

TECHNICAL FIELD

The present invention relates to a wireless transmission system, a wireless reception system, a base station apparatus, and a wireless communication system, using radio over fiber (RoF), and a wireless transmission method, and a wireless reception method.

BACKGROUND ART

In wireless communication services, a millimeter wave band is attracting attention as a frequency band capable of high-speed transmission. However, there is a problem that it is difficult to perform long-distance transmission with a millimeter wave band due to a large propagation loss. As one solution for this problem, an RoF system is known. In the RoF system, an accommodation station apparatus (master station) performs intensity modulation on an optical carrier with a radio frequency (RF) signal to be transmitted to generate an optically modulated signal, and transmits the generated optically modulated signal through an optical fiber. A base station apparatus (slave station) demodulates the optically modulated signal received via the optical fiber into an RF signal and emits the demodulated RF signal as a radio wave from an antenna. Use of such an RoF system enables long-distance transmission of an RF signal of a millimeter wave band.

Even if the RoF system is applied to a millimeter band to enable long-distance transmission, expansion of a coverage area of the base station apparatus is problematic. One solution for this problem is beam forming using an array antenna. In the beam forming using an array antenna, the phase of an RF signal incident on each antenna element of the array antenna is controlled such that radio waves radiated from the antenna elements interfere with each other. This makes it possible to control radiation directions of the radio waves as a whole.

For example, there is a phenomenon that a delay difference occurs between optical signals of different wavelengths due to wavelength dispersion when transmission is performed through optical fibers. As beam forming in the RoF system, a technique is known in which the phases of RF signals incident on antenna elements through control of wavelengths of optical carriers using the phenomenon (see PTL 1, for example).

FIG. 18 is a block diagram of an RoF system to which the technique disclosed in PTL 1 is applied. A multi-wavelength variable light source 101 of an accommodation station apparatus 100 outputs a plurality of optical signals. The wavelength intervals among the plurality of optical signals can be arbitrarily changed. An optical modulator 102 modulates an optical signal of each wavelength with an RF signal to be transmitted. The optical modulator 102 generates and outputs optically modulated signals of a plurality of wavelengths. An optical fiber 300 transmits the optically modulated signals of the plurality of wavelengths.

When the optical fiber 300 transmits the optically modulated signals of the plurality of wavelengths, different delay differences occur for each wavelength due to the influence of wavelength dispersion in the optically modulated signals. The plurality of optically modulated signals transmitted through the optical fiber 300 are branched for each wavelength by an optical demultiplexer 201 of the base station apparatus 200. Each of a plurality of optical/electrical (O/E) converters 202-1 to 202-$n$ converts the branched optically modulated signal of each wavelength into an electrical signal and demodulates the RF signals. Antenna elements 203-1 to 203-$n$ emit the demodulated RF signals as radio waves. At this time, phase differences occur in the RF signals as well due to the delay differences caused by wavelength dispersion occurring at the time of the transmission through the optical fiber 300. Thus, directivity is formed in the emitted radio waves of the RF signals.

The method of performing beam forming is not limited to the RoF system, and there is also a method of beamforming array antennas by using optical signals that can be applied to arbitrary wireless communication systems. As one such method, a technique is known in which a fixed wavelength is allocated to each antenna element without controlling wavelengths, and delay differences are caused in the optical signal of each wavelength using wavelength dispersion and path differences (see NPL 1, for example).

FIG. 19 is a block diagram illustrating a wireless system to which the technique described in NPL 1 is applied. A multi-wavelength variable light source 401 outputs a plurality of optical signals of different wavelengths. An optical modulator 402 modulates an optical signal of each wavelength with an RF signal to be transmitted and generates a plurality of optically modulated signals. The optical modulator 402 outputs the generated plurality of optically modulated signals to a programmable dispersion matrix (PDM) 403. The PDM 403 receives the plurality of optically modulated signals.

FIG. 20 is a block diagram illustrating an internal configuration of the PDM 403. The PDM 403 includes n+1 2×2 optical switches 411-1 to 411-($n$+1) and n dispersing element portions 412-1 to 412-$n$. Dispersion values applied to input signals by the n dispersing element portions 412-1 to 412-$n$ are D0, 2D0, . . . , $2^{n-1}$D0, respectively. Dispersion fibers or grating fibers, for example, can be applied to the dispersing element portions 412-1 to 412-$n$. The PDM 403 adjusts the dispersion values as a whole through switching of the 2×2 optical switches 411-1 to 411-($n$+1). In this manner, different delay differences in accordance with the dispersion values adjusted by the PDM 403 occur in each optically modulated signal received by the PDM 403.

Returning to FIG. 19, the plurality of optically modulated signals output by the PDM 403 is branched for each wavelength by the optical demultiplexer 404 in the wireless system divides. A plurality of output ports included in the optical demultiplexer 404 are allocated to each wavelength in a fixed manner. In this manner, the antenna elements 406-1 to 406-$n$ are associated with respective wavelengths in advance.

By the optical demultiplexer 404, an optically modulated signal is demultiplexed, and each of the demultiplexed optically modulated signals is branched and output to an output port corresponding to each wavelength. Each of a plurality of O/E converters 405-1 to 405-$n$ converts the optically modulated signal of each wavelength branched and output by the optical demultiplexer 404 into an electrical signal and demodulates the RF signal. Antenna elements 406-1 to 406-n emit the demodulated RF signals as radio waves. Phase differences occur in the RF signals as well due to delay differences caused by dispersion by the PDM 404. Thus, directivity is formed in the emitted radio waves of the RF signals.

Further, in a case in which electrical phase adjustment is performed on the RF signals to perform beam forming, a phase shifter or the like is typically used, and as a beam forming method, another method is known in which a beam forming network (BFN) is used (see NPL 2, for example).

FIG. 21 is a block diagram illustrating a beam forming method using a matrix operation unit 500 that performs a BFN matrix operation. The matrix operation unit 500 includes m input ports 501-1 to 501-m and n output ports 502-1 to 502-n. n antenna elements 503-1 to 503-n are connected to the n output ports 502-1 to 502-2n.

When an RF signal is sent to one certain input port, for example, the input port 501-i of the matrix operation unit 500, the matrix operation unit 500 performs a BFN matrix operation on the sent RF signal and outputs RF signals having the same amplitude and having phases with a linear inclination from each of the n output ports 502-1 to 502-n. The n antenna elements 503-1 to 503-n emit radio waves of the RF signals output from the output ports 502-1 to 502-n. The radio waves of then RF signals emitted by the antenna elements 503-1 to 503-n have phases with a linear inclination. Thus, a transmission beam 600-i is formed in a specific direction.

In the BFN matrix operation, the linear inclination of the phases of the RF signals output from the output ports 502-1 to 502-n differs from each other depending on the positions of the input ports 501-1 to 501-m. Thus, a directivity of a transmission beam 600-i formed in a case in which an RF signal is sent to the input port 501-i and a directivity of a transmission beam 600-j formed in a case in which an RF signal is sent to an input port 501-j (i≠j) are mutually different directions, for example.

Further, the BFN matrix operation has input/output reversibility. It is assumed that an RF signal is sent to the input port 501-i of the matrix operation unit 500, and the transmission beam 600-i is thus formed. If radio waves of RF signals with the same frequency arrive from the direction of the transmission beam 600-i at this time, then each of the antenna elements 503-1 to 503-n receives the arriving RF signals and outputs the received RF signals to the n output ports 502-1 to 502-n of the matrix operation unit 500. The matrix operation unit 500 inversely applies the BFN matrix operation to the RF signals sent to the n output ports 502-1 to 502-n. As a result, the matrix operation unit 500 outputs an RF signal only from the input port 501-i. This means that the RF signals sent to the n output ports 502-1 to 502-n are subjected to in-phase synthesis and are then output only from the input port 501-i, and selection of the RF signal to be output from the input port 501-i means forming a reception beam.

The matrix operation unit 500 can be used to form a plurality of transmission beams 600-1 to 600-m. The plurality of transmission beams 600-1 to 600-m in different directions are formed by sending the RF signals to the plurality of input ports 501-1 to 501-m. The matrix operation unit 500 can be used to form a plurality of reception beams. The plurality of reception beams in different directions are formed by selecting the RF signals to be output from the plurality of input ports 501-1 to 501-m.

As a matrix applied to the BFN matrix operation performed by the matrix operation unit 500, a Butler matrix, a Rotman lens, a Blass matrix, and a Nolen matrix, for example, are known.

CITATION LIST

Patent Literature

PTL 1: Japanese Patent No. 4246724

Non Patent Literature

NPL 1: Dennis T. K. Tong, Ming C. Wu, "A Novel Multiwavelength Optically Controlled Phased Array Antenna with a Programmable Dispersion Matrix", IEEE Photonics Technology Letters, June 1996, VOL. 8, NO. 6, p. 812 to 814
NPL 2: Luo, Q., Gao, S. S., Liu, W., & Gu, C. "Low-cost Smart Antennas", Wiley, (2019), p. 253 to 265

SUMMARY OF THE INVENTION

Technical Problem

As described above, the technique disclosed in PTL 1 makes the wavelength variable to cause a delay difference in modulated optical signals in a state in which dispersion is fixed. At this time, it is necessary to greatly adjust wavelength intervals between optically modulated signals depending on a direction in which directivity is to be formed, an optical fiber length, and a frequency of the RF signal. This may lead to an increase in wavelength band to be used, and degradation of wavelength utilization efficiency is conceivable.

For example, there is a circumstance where a different wavelength has to be used by each base station in a wavelength division multiplex (WDM)-passive optical network (PON). If the technique of PTL 1 is applied to the WDM-PON under such a circumstance, then it is necessary to further secure wavelength bands for beam forming for the WDM-PON in advance, and the wavelength bands to be used significantly increase.

Further, according to the technique of PTL 1, the wavelengths are adjusted to form directivity. Thus, it is also necessary to adjust the wavelengths of the optical signals to be output to the antenna elements 203-1 to 203-n of the base station apparatus 200. It is thus necessary to change the wavelengths of the optical signals to be output to the antenna elements 203-1 to 203-n of the base station apparatus 200 every time the optical demultiplexer 201 of the base station apparatus 200 forms directivity.

When the directivity is dynamically changed, it is also necessary to dynamically change the branching performed by the optical demultiplexer 201. For this purpose, it is necessary to control the optical demultiplexer 201 of the base station apparatus 200. One advantage of the application of the RoF system is that it is possible to simplify the base station apparatus 200 by concentrating functions on the accommodation station apparatus 100, in addition to long-distance transmission of the RF signals. However, in a case in which the technique of PTL 1 is used, because it is necessary to control the optical demultiplexer 201 of the base station apparatus 200, the simplification of the base station apparatus 200 is limited.

Further, the technique disclosed in PTL 1 requires information regarding the distance of the optical fiber for adjusting wavelengths to adjust the delay differences between the optically modulated signals. Typically, the distance of the optical fiber from the accommodation station apparatus 100 to the base station apparatus 200 is not known, or even if the distance is known, the exact length is not known in many cases. It is very difficult to measure the fiber length particularly when the optical fiber is in a passive optical network (PON) configuration. Because PTL 1 requires the information regarding the exact length of the optical fiber, the application range is considered to be significantly limited.

On the other hand, the technique described in NPL 1 fixes the wavelength and makes the dispersion variable to cause a delay difference in the modulated optical signal. According to the technique of NPL 1, the wavelength is fixed, and wavelength utilization efficiency is improved as compared with PTL 1. In addition, it is not necessary to control the optical demultiplexer because optical branching is fixed. However, high accuracy is considered to be needed to design and produce the PDM for adjusting dispersion. Thus, the technique described in NPL 1 has a problem that there is a concern of increase in size and cost of the apparatus.

Further, NPL 1 has no mention that the technique is applied to RoF. In a case in which long-distance optical fiber transmission is performed by applying the RoF to the technique described in NPL 1, there is a problem that influences of wavelength dispersion at the time of optical fiber transmission have to be taken into consideration in addition to dispersion adjustment achieved by the PDM. Further, both PTL 1 and NPL 1 mention only beam forming of transmission antennas and do not mention beam forming of reception antennas. In addition, NPL 2 also fails to mention the application to the RoF.

In view of the aforementioned circumstances, an object of the present invention is to provide a technique with which beam forming of transmission and reception antennas can be performed without using control of the base station apparatus or information regarding the distance of the optical fiber while curbing decrease in wavelength utilization efficiency and an increase in cost, in the wireless communication system using the RoF.

Means for Solving the Problem

According to an aspect of the present invention, there is provided a wireless transmission system including: an accommodation station transmission unit configured to modulate light based on an RF signal to generate an optical signal and output the generated optical signal; and a base station transmission unit configured to receive the optical signal output by the accommodation station transmission unit. The base station transmission unit includes: an optical demultiplexer including a plurality of output ports assigned to a plurality of wavelengths of the light, the optical demultiplexer being configured to receive, from an input port, the optical signal output by the accommodation station transmission unit, demultiplex the received optical signal for each of the plurality of wavelengths, and output the demultiplexed optical signal from the output port corresponding to the wavelength, a plurality of photoelectric converters, each of which is connected to each of the plurality of output ports of the optical demultiplexer, the plurality of photoelectric converters being configured to convert the optical signal output by the optical demultiplexer into an electrical signal to demodulate the RF signal and output the demodulated RF signal, a matrix operation unit including a plurality of first ports and a plurality of second ports, the matrix operation unit being configured to perform, using each of the plurality of first ports as a reference port, on a plurality of signals received by a plurality of the reference ports, a BFN matrix operation of making a phase change that is different for a position of the reference port and the phase change that causes phases of signals output by the plurality of second ports to have a linear inclination, each of the plurality of first ports being connected to an output of each of the plurality of photoelectric converters to receive the RF signal output by each of the photoelectric converters connected to each of the plurality of first port, and a plurality of transmission antennas, each of which is connected to each of the plurality of second ports of the matrix operation unit, the plurality of transmission antennas being configured to form a plurality of transmission beams in different directions for each of the wavelengths through emission of the RF signal output by each of the second ports after the BFN matrix operation.

According to an aspect of the present invention, there is provided a wireless reception system including a base station reception unit and an accommodation station reception unit. The base station reception unit includes: a plurality of reception antennas configured to form a plurality of reception beams using an arriving RF signal and receive the plurality of formed reception beams; a matrix operation unit including a plurality of first ports and a plurality of second ports, the matrix operation unit being configured to use each of the plurality of first ports as a reference port and perform, on a plurality of signals obtained by a plurality of reference ports, a BFN matrix operation of making a phase change that is different depending on a position of the reference port and the phase change that causes phases of a plurality of signals output from the plurality of second ports to have a linear inclination, the plurality of second ports being connected to the plurality of reception antennas and receiving the RF signal received and output by the plurality of reception antennas using the plurality of reception beams; a plurality of optical modulators, each of which is connected to each of the plurality of first ports of the matrix operation unit to provide light of different wavelengths to each of the plurality of first ports, the optical modulator being configured to modulate the provided light to generate an optical signal based on the RF signal obtained through an inverse operation of the BFN matrix operation and output from each of the plurality of the first ports; and an optical multiplexer configured to multiplex a plurality of optical signals generated by the plurality of optical modulators and output the plurality of multiplexed optical signals, and the accommodation station reception unit is configured to receive the optical signal output by the base station reception unit, the accommodation station reception unit includes: an optical demultiplexer configured to receive the optical signal output by the optical multiplexer included in the base station reception unit and demultiplex the optical signal for a wavelength, and an output unit configured to convert the optical signal demultiplexed by the optical demultiplexer into an electrical signal to demodulate the RF signal and output the demodulated RF signal.

According to an aspect of the present invention, there is provided a base station apparatus including: the aforementioned base station transmission unit; and the aforementioned base station reception unit.

According to an aspect of the present invention, there is provided a wireless communication system including: the aforementioned wireless transmission system; and the aforementioned wireless reception system.

According to an aspect of the present invention, there is provided a wireless transmission method performed by a wireless transmission system including an accommodation station transmission unit and a base station transmission unit, the method comprising: by the accommodation station transmission unit, modulating light to generate an optical signal based on an RF signal and outputting the generated optical signal; by an optical demultiplexer included in the base station transmission unit, receiving the optical signal output by the accommodation station transmission unit from an input port, demultiplexing the received optical signal for a wavelength, and outputting the demultiplexed optical signal from, among a plurality of output ports assigned to a wavelength of the light, the output ports corresponding to the wavelength; by each of a plurality of photoelectric converters included in the base station transmission unit being connected to each of the plurality of output ports of the optical demultiplexer, converting the optical signal output by the optical demultiplexer into an electrical signal to demodulate the RF signal and outputting the demodulated RF signal; by a matrix operation unit included in the base station transmission unit including a plurality of first ports and a plurality of second ports, using each of the plurality of first ports as a reference port, performing, on a plurality of signals obtained by a plurality of reference ports, a BFN matrix operation of making a phase change that is different for a position of the reference port and the phase change that causes phases of signals output from the plurality of second ports to have a linear inclination, and by each of the plurality of first ports, receiving the RF signal output by the photoelectric converter connected to each of the plurality of first ports; and by a plurality of transmission antennas included in the base station transmission unit, forming a plurality of transmission beams in different directions for each of the wavelengths through emission of the RF signal output from each of the second ports of the matrix operation unit after the BFN matrix operation.

According to an aspect of the present invention, there is provided a wireless reception method performed by a wireless reception system including a base station reception unit and an accommodation station reception unit. The method includes: by a plurality of reception antennas included in the base station reception unit, forming a plurality of reception beams using an arriving RF signal and receiving the formed reception beams; by a matrix operation unit included in the base station reception unit including a plurality of first ports and a plurality of second ports, using each of the plurality of first ports as a reference port and performing, on a plurality of signals obtained by a plurality of reference ports, a BFN matrix operation of making a phase change that is different depending on a position of the reference port and causing phases of a plurality of signals output from the plurality of second ports to have a linear inclination, and by each of the plurality of second ports, receiving a plurality of RF signals received and output by the plurality of reception antennas connected to each of the plurality of second ports; by a plurality of optical modulators included in the base station reception unit, modulating light of different wavelengths sent to each of the plurality of optical modulators to generate a plurality of optical signals based on the plurality of RF signals obtained through an inverse operation of the BFN matrix operation and output by each of the plurality of first ports of the matrix operation; by an optical multiplexer included in the base station reception unit, multiplexing the plurality of optical signals generated by the plurality of optical modulators and outputting the plurality of multiplexed optical signal; by an optical demultiplexer included in the accommodation station reception unit, receiving the optical signal output by the optical multiplexer included in the base station reception unit and demultiplexing the optical signal for a wavelength; and by an output unit included in the accommodation station reception unit, converting the optical signal demultiplexed by the optical demultiplexer into an electrical signal to demodulate the RF signal and outputting the demodulated RF signal.

Effects of the Invention

According to the present invention, in a wireless communication system using a RoF, it is possible to perform beam forming of transmission and reception antennas without using control of a base station apparatus and information regarding a distance of an optical fiber while curbing decrease in wavelength utilization efficiency and an increase in cost.

DESCRIPTION OF EMBODIMENTS

Basic Embodiment

Figure 1:
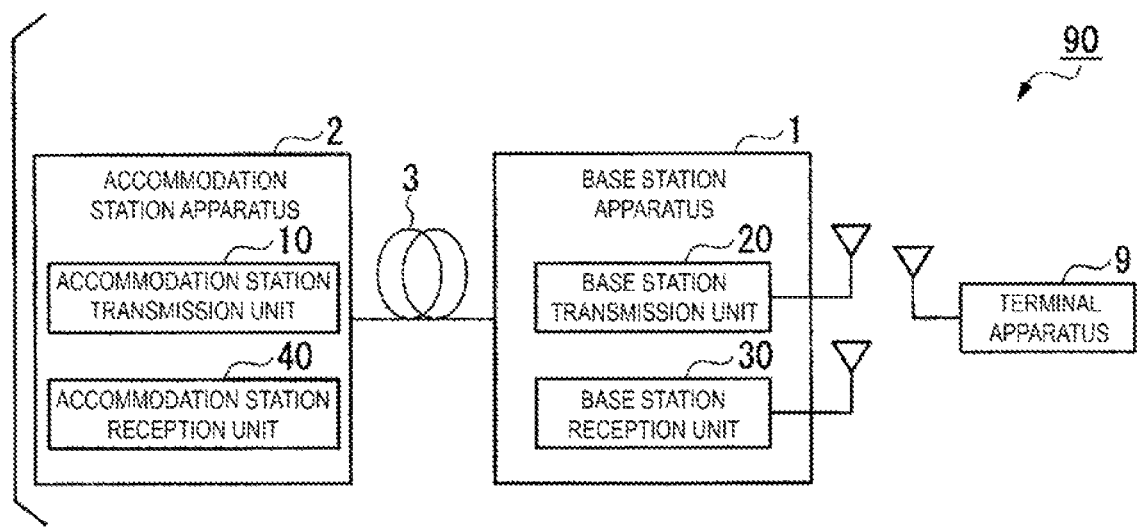
FIG. 1 is a block diagram illustrating a configuration of a basic embodiment of the present invention.

Embodiments of the present invention will be described below with reference to the drawings. FIG. 1 is a block diagram illustrating a configuration of a wireless communication system 90 according to an embodiment of the present invention. The wireless communication system 90 includes an accommodation station apparatus 2, a base station apparatus 1, a terminal apparatus 9, and an optical fiber 3 connecting the accommodation station apparatus 2 to the base station apparatus 1.

The accommodation station apparatus 2 includes an accommodation station transmission unit 10 and an accommodation station reception unit 40. The base station apparatus 1 includes a base station transmission unit 20 and a base station reception unit 30. The accommodation station transmission unit 10 transmits an optical signal modulated with an RF signal to the base station transmission unit 20 through the optical fiber 3. The base station transmission unit 20 receives the optical signal, demodulates the RF signal, and transmits the RF signal to the terminal apparatus 9 through wireless communication. The terminal apparatus 9 transmits the RF signal to the base station reception unit 30 through wireless communication. The base station reception unit 30 receives the RF signal transmitted by the terminal apparatus 9 and transmits the optical signal modulated with the received RF signal to the accommodation station reception unit 40 through the optical fiber 3.

Figure 2:
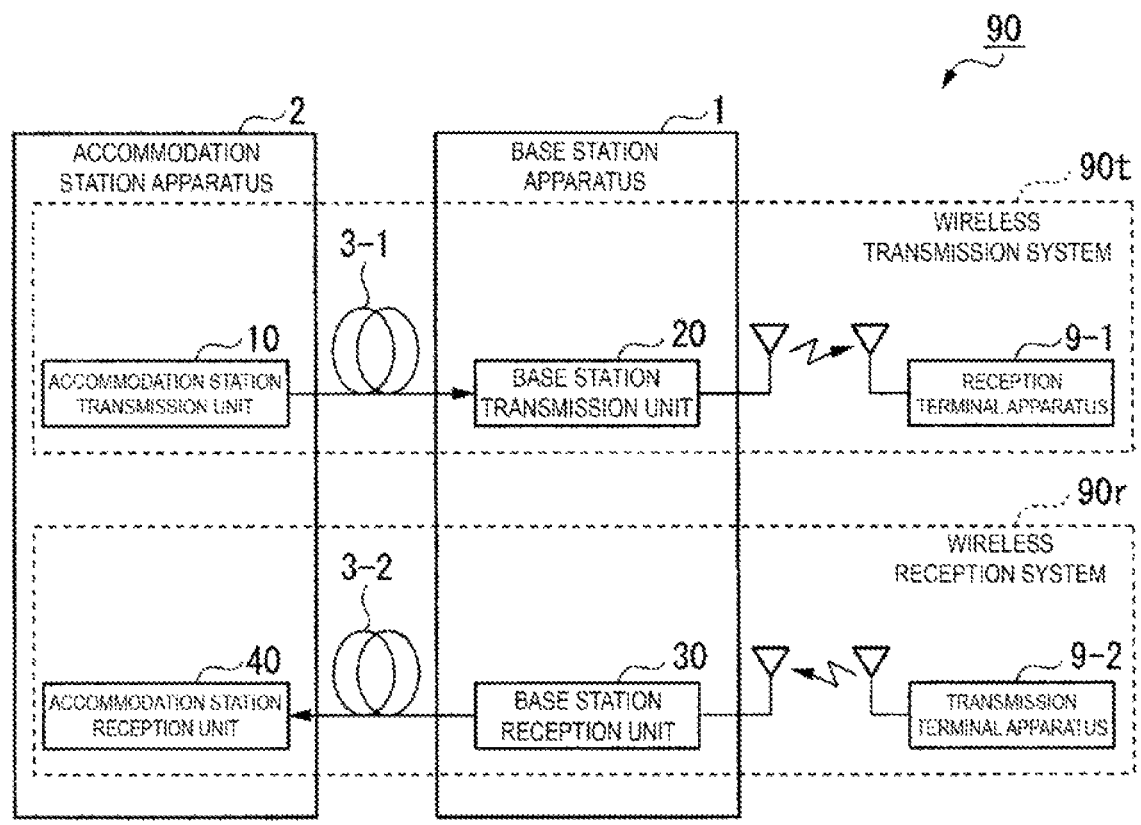
FIG. 2 is a block diagram illustrating a wireless transmission system and a wireless reception system separately in the basic embodiment.

FIG. 2 is a block diagram illustrating a transmission side and a reception side of the wireless communication system 90 separately. FIG. 2 illustrates, for convenience of explanation, a reception terminal apparatus 9-1 that performs only reception of the RF signal and a transmission terminal apparatus 9-2 that performs only transmission of the RF signal of the terminal apparatus 9 of FIG. 1 separately. Further, for convenience of explanation, the optical fiber 3 illustrated in FIG. 2 includes two cores, and a downstream optical fiber 3-1 that transmits the RF signal to the reception terminal apparatus 9-1 and an upstream optical fiber 3-2 that transmits the RF signal from the transmission terminal apparatus 9-2 are illustrated separately.

If the wireless communication system 90 is divided into the transmission side and the reception side, the divided systems can be represented as a wireless transmission system 90t and a wireless reception system 90r. The wireless transmission system 90t includes the accommodation station transmission unit 10, the downstream optical fiber 3-1, the base station transmission unit 20, and the reception terminal apparatus 9-1. The wireless reception system 90r includes the transmission terminal apparatus 9-2, the base station reception unit 30, the upstream optical fiber 3-2, and the accommodation station reception unit 40.

Hereinafter, in a first embodiment, the wireless transmission system 90t on the transmission side in a single mode, that is, with a configuration in which a beam of a single RF signal is transmitted and received, will be described as a wireless transmission system 90t1. Further, in a second embodiment, the wireless reception system 90r on the reception side in the single mode will be described as a wireless reception system 90r1.

Further, in a third embodiment, the wireless transmission system 90t on the transmission side in a multi-mode, that is, with a configuration in which beams of a plurality of RF signals are transmitted and received, will be described as a wireless transmission system 90t2. Further, in a fourth embodiment, the wireless reception system 90r on the reception side in the multi-mode will be described as a wireless reception system 90r2.

First Embodiment: Transmission Side in Single Mode

Figure 3:
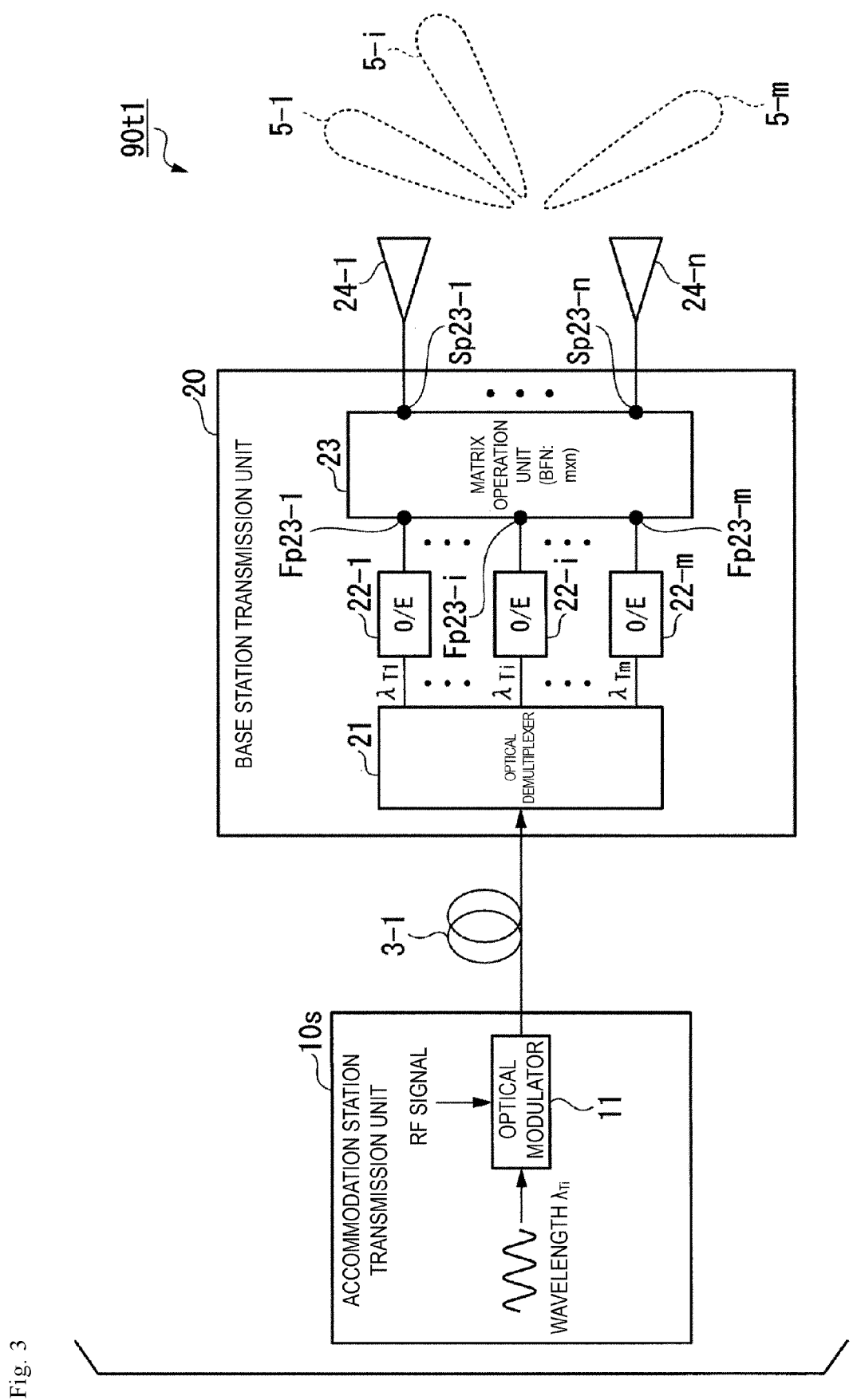
FIG. 3 is a block diagram illustrating a configuration of a wireless transmission system according to a first embodiment of the present invention.

FIG. 3 is a block diagram illustrating a configuration of the wireless transmission system 90t1 according to the first embodiment. The wireless transmission system 90t1 includes an accommodation station transmission unit 10s, the base station transmission unit 20, the downstream optical fiber 3-1, and the reception terminal apparatus 9-1 illustrated in FIG. 2, although not illustrated in FIG. 3.

The accommodation station transmission unit 10s includes an optical modulator 11. The optical modulator 11 obtains light of a single wavelength $\lambda_{Ti}$ arbitrarily selected from light of m wavelengths $\lambda_{T1}$ to $\lambda_{Tm}$ and, using the light of the wavelength $\lambda_{Ti}$ as a carrier, performs intensity modulation with an Rf signal to be transmitted to generate an optical signal of the wavelength $\lambda_{Ti}$. Here, the wavelengths $\lambda_{T1}$ to $\lambda_{Tm}$ are mutually different wavelengths, m is an integer that is equal to or greater than 2, and i is any value from 1 to m. The optical modulator 11 outputs the generated optical signal of the wavelength $\lambda_{Ti}$ to the downstream optical fiber 3-1.

Figure 4:
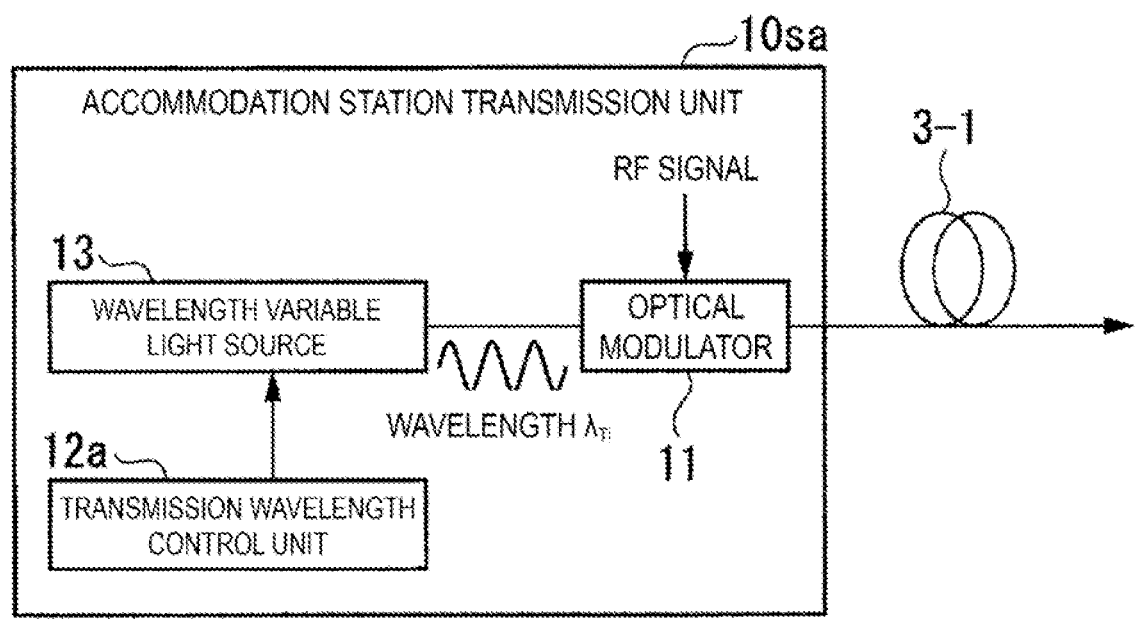
FIG. 4 is a block diagram illustrating an internal configuration of an accommodation station transmission unit according to the first embodiment.

FIG. 4 is a block diagram illustrating an internal configuration of an accommodation station transmission unit 10sa that is an example of a specific configuration of the accommodation station transmission unit 10s that generates light of the single wavelength $\lambda_{Ti}$. Note that the optical modulator 11 illustrated in FIG. 4 has the same configuration as the optical modulator 11 in FIG. 3. The accommodation station transmission unit 10sa illustrated in FIG. 4 includes the optical modulator 11, a transmission wavelength control unit 12a, and a wavelength variable light source 13.

The transmission wavelength control unit 12a outputs, to the wavelength variable light source 13, a control signal for designating a wavelength of light to be generated. The wavelength variable light source 13 generates light of any one arbitrary wavelength $\lambda_{Ti}$ from among the wavelengths $\lambda_{T1}$ to $\lambda_{Tm}$. When receiving the control signal output by the transmission wavelength control unit 12a, the wavelength variable light source 13 generates and outputs the light of the wavelength $\lambda_{Ti}$ designated by the control signal. In other words, by the transmission wavelength control unit 12a switching the wavelength to be designated by the control signal, the wavelength $\lambda_{Ti}$ of the optical signal to be generated and output by the optical modulator 11 is switched.

Returning to FIG. 3, the downstream optical fiber 3-1 transmits the optical signal of the wavelength $\lambda_{Ti}$ output by the optical modulator 11 to the base station transmission unit 20. The base station transmission unit 20 includes an optical demultiplexer 21, m O/E converters (in the present specification, the "O/E converters" may also be referred to as "photoelectric converters") 22-1 to 22-*m*, a matrix operation unit 23, and n transmission antennas 24-1 to 24-*n*. Here, n is an integer that is equal to or greater than 2, and n may be the same value as m or may be a different value.

The optical demultiplexer 21 includes one input port and m output ports, and the one input port is connected to the downstream optical fiber 3-1. Each of them output ports of the optical demultiplexer 21 is allocated to each of them wavelengths $\lambda_{T1}$ to $\lambda_{Tm}$ in a fixed manner. The O/E converters 22-1 to 22-*m* are connected to the m output ports, and for example, the wavelengths $\lambda_{T1}, \lambda_{T2}, \ldots, \lambda_{Ti}, \ldots, \lambda_{Tm}$ are allocated in a fixed manner in order from the output port to which the O/E converter 22-1 is connected.

The optical demultiplexer 21 receives the optical signal transmitted through the downstream optical fiber 3-1, demultiplexes the received optical signal for each of the wavelengths, and each of the demultiplexed optical signals is branched and output to the output port corresponding to each wavelength. Each of the O/E converters 22-1 to 22-*m* obtains the optical signal output by the optical demultiplexer 21 from the n output ports and converts the obtained optical signal into an electrical signal to demodulate and output the RF signal superimposed on the optical signal.

The matrix operation unit 23 is a functional unit that performs a BFN matrix operation and includes m first ports Fp23-1 to Fp23-*m* and n second ports Sp23-1 to Sp23-*n*. The m first ports Fp23-1 to Fp23-*m* are input ports, each of the O/E converters 22-1 to 22-*m* is connected to each of the first ports Fp23-1 to Fp23-*m* to receive the RF signal output by each of the O/E converters 22-1 to 22-*m*. Then second ports Sp23-1 to Sp23-*n* of the matrix operation unit 23 are output ports, and each of the transmission antennas 24-1 to 24-*n* is connected to each of the second ports Sp23-1 to Sp23-*n*.

In a case in which any one of the first ports Fp23-1 to Fp23-*m* is used as a reference port, the matrix operation unit 23 performs, on an RF signal received by the reference port, a BFN matrix operation of making a phase change that is different depending on the position of the reference port and causes each of phases of RF signals output from the n second ports Sp23-1 to Sp23-*n* to have a linear inclination.

The matrix operation unit 23 outputs the n RF signals obtained through the BFN matrix operation from the n second ports Sp23-1 to Sp23-*n*. Note that the n RF signals output from the n second ports Sp23-1 to Sp23-*n* have equal amplitudes.

Here, a specific example of the phase change that is different depending on the position of the reference port and causes each of phases of the n RF signals output from the n second ports to have a linear inclination will be described. For example, it is assumed that m=n=4 and the matrix operation unit 23 includes four first ports Fp23-1 to Fp 23-4 and four second ports Sp23-1 to Sp23-4.

In a case in which the first port Fp23-1 is used as the reference port, the matrix operation unit 23 performs a phase change with a linear inclination to the RF signal received from the first port Fp23-1 and generates four RF signals with different phases. Then, the matrix operation unit 23 outputs the four generated RF signals from each of the second ports Sp23-1 to Sp23-4. Here, the phase change with a linear inclination is, for example, a phase change of (−45°, −90°, −135°, and 180°). In other words, the matrix operation unit 23 outputs the RF signal to which the phase change of "−45°" has been made from the second port Sp23-1, outputs the RF signal to which the phase change of "−90°" has been made from the second port Sp23-2, outputs the RF signal to which the phase change of "−135°" has been made from the second port Sp23-3, and outputs the RF signal to which the phase change of "180°" has been made from the second port Sp23-4.

Further, in a case in which the first port Fp23-2 is used as the reference port, the matrix operation unit 23 preforms a phase change of (−135°, 0°, 135°, −90°) as the phase change with a linear inclination to the RF signal received from the first port Fp23-2 to generate four RF signals with different phases and outputs the four generated RF signals from each of the second ports Sp23-1 to Sp23-4.

Further, in a case in which the first port Fp23-3 is used as the reference port, the matrix operation unit 23 performs a phase change of (−90°, 135°, 0°, −135°) as a phase change with a linear inclination to the RF signal received from the first port Fp23-3 to generate four RF signals with different phases and outputs the four generated RF signals from each of the second ports Sp23-1 to Sp23-4.

Further, in a case in which the first port Fp23-4 is used as the reference port, the matrix operation unit 23 performs a phase change of (180°, −135°, −90°, −45°) as a phase change with a linear inclination to the RF signal received from the first port Fp23-4 to generate four RF signals with different phases and outputs the four generated RF signals from each of the second ports Sp23-1 to Sp23-4.

Each of the transmission antennas 24-1 to 24-*n* is connected to each of the second ports Sp23-1 to Sp23-*n* of the matrix operation unit 23, and the matrix operation unit 23 emits radio waves of RF signals output from the second ports Sp23-1 to Sp23-*n*.

Transmission beams are formed in specific directions because the phases of the radio waves of the RF signals emitted from each of the transmission antennas 24-1 to 24-*n* have the linear inclinations. Further, different phase changes are made to the RF signals in accordance with the positions of the first ports Fp23-1 to Fp23-*m*. Thus the directions of the formed transmission beams are different directions in accordance with the positions of the first ports Fp23-1 to Fp23-*m* of the matrix operation unit 23. FIG. 3 illustrates an example in which a transmission beam 5-1 is formed for the RF signal received by the first port Fp23-1, a transmission beam 5-*i* is formed for the RF signal received by the first port Fp23-*i*, and a transmission beam 5-*m* is formed for the RF signal received by the first port Fp23-*m*.

Figure 5:
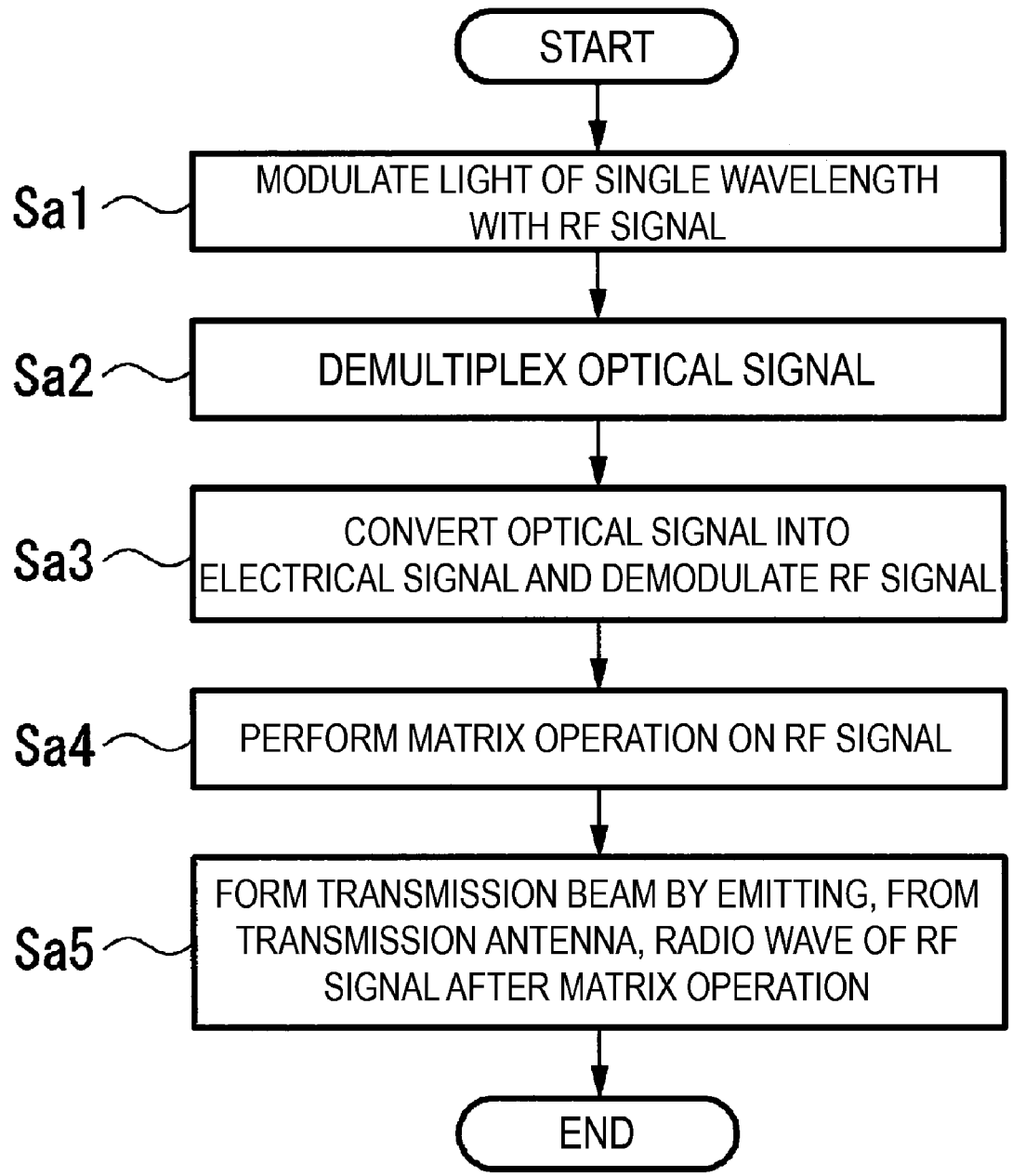
FIG. 5 is a flowchart illustrating a flow of processing performed by the wireless transmission system according to the first embodiment.

Processing Performed by Wireless Transmission System According to First Embodiment FIG. 5 is a flowchart illustrating a flow of processing performed by a wireless transmission system 90*t*1 according to the first embodiment. The following description will be given on the assumption that the accommodation station transmission unit 10*sa* illustrated in FIG. 4, for example, is included as the accommodation station transmission unit 10*s*.

The transmission wavelength control unit 12*a* of the accommodation station transmission unit 10*sa* outputs, to the wavelength variable light source 13, a control signal for designating the wavelength $\lambda_{Ti}$ as any one of the wavelengths. The wavelength variable light source 13 generates light of the wavelength $\lambda_{Ti}$ designated by the control signal and outputs the light to the optical modulator 11. The optical modulator 11 performs intensity modulation with an RF signal to be transmitted using light of the wavelength $\lambda_{Ti}$ output by the wavelength variable light source 13 as an optical carrier and generates an optical signal. The optical modulator 11 outputs the generated optical signal to the downstream optical fiber 3-1 (Step Sa1).

The downstream optical fiber 3-1 transmits the optical signal output by the optical modulator 11 to the optical demultiplexer 21 of the base station transmission unit 20. The optical demultiplexer 21 demultiplexes the optical signal obtained from the downstream optical fiber 3-1 into m wavelengths $\lambda_{T1}$ to $\lambda_{Tm}$. By the optical demultiplexer 21, the demultiplexed optical signals are branched to an output port corresponding to the wavelength of each of the demultiplexed optical signals and outputs to each of the O/E converters 22-1 to 22-m connected to the output ports (Step Sa2).

Here, the optical signal output by the optical modulator 11 is only an optical signal of the wavelength $\lambda_{Ti}$. Thus, the optical demultiplexer 21 demultiplexes only the optical signal of the wavelength $\lambda_{Ti}$, and only the O/E converter 22-i connected to the output port corresponding to the wavelength $\lambda_{Ti}$ obtains the optical signal. The O/E converter 22-i converts the optical signal of the wavelength $\lambda_{Ti}$ branched and output by the optical demultiplexer 21 into an electrical signal and demodulates the RF signal (Step Sa3).

The O/E converter 22-i outputs the demodulated RF signal to the first port Fp23-i of the matrix operation unit 23 to which the O/E converter 22-i itself is connected. The matrix operation unit 23 uses the first port Fp23-i as a reference port, performs a BFN matrix operation on the RF signal received by the first port Fp23-i, and outputs n RF signals after the matrix operation from each of the second ports Sp23-1 to Sp23-n (Step Sa4).

Each of the transmission antennas 24-1 to 24-n emits radio waves of n RF signals output by the matrix operation unit 23 from each of the second ports Sp23-1 to Sp23-n (Step Sa5). In this manner, the transmission beam 5-i is formed in the specific direction in accordance with the position of the first port Fp23-i. The reception terminal apparatus 9-1 receives and obtains the RF signal transmitted by the transmission beam 5-i.

Figure 6:
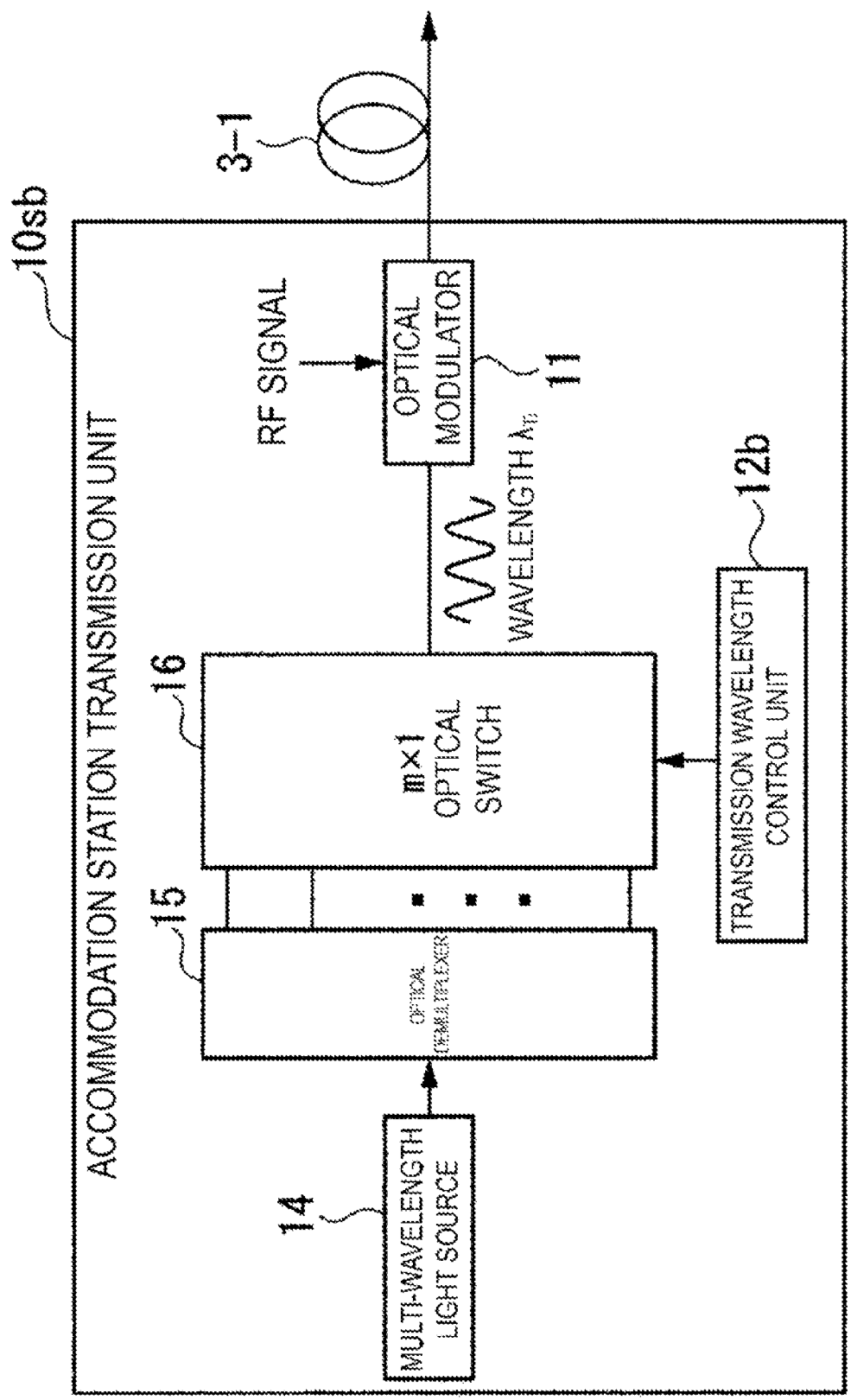
FIG. 6 is a block diagram illustrating an internal configuration in another configuration example of the accommodation station transmission unit according to the first embodiment.

Another Configuration Example of Accommodation Station Transmission Unit According to First Embodiment Note that an accommodation station transmission unit 10*sb* illustrated in FIG. 6 may be applied as the accommodation station transmission unit 10*s* in place of the accommodation station transmission unit 10*sa* illustrated in FIG. 4. The accommodation station transmission unit 10*sb* illustrated in FIG. 6 includes the optical modulator 11, a transmission wavelength control unit 12*b*, a multiple-wavelength light source 14, an optical demultiplexer 15, and m×1 optical switches 16. Note that the optical modulator 11 illustrated in FIG. 6 has the same configuration as the optical modulator 11 in FIG. 3.

The multiple-wavelength light source 14 generates and outputs light of the wavelengths $\lambda_{T1}$ to $\lambda_{Tm}$. The optical demultiplexer 15 includes one input port and m output ports, and each of the m output ports is allocated to each of the m wavelengths $\lambda_{T1}$ to $\lambda_{Tm}$ in a fixed manner. The optical demultiplexer 15 demultiplexes light of the wavelengths $\lambda_{T1}$ to $\lambda_{Tm}$ output by the multiple-wavelength light source 14 for each of the wavelengths, and the demultiplexed light is branched and output to the output ports corresponding to each wavelength.

The m×1 optical switches 16 include m input ports and one output ports, and each of the m input ports is connected to each of the m output ports of the optical demultiplexer 15. The m×1 optical switches 16 shift switches based on a control signal received from the transmission wavelength control unit 12*b* and connect any one of the m input ports to the output port.

The transmission wavelength control unit 12*b* outputs, to the m×1 optical switches 16, a control signal to cause the input port that obtains the light of the one wavelength $\lambda_{Ti}$ to be sent to the optical modulator 11 from the optical demultiplexer 15 to be connected to the output port. The wavelength of the optical signal to be generated and output by the optical modulator 11 is switched by the transmission wavelength control unit 12*b* switching the output port as a connecting destination of the input port of the m×1 optical switches 16 using the control signal.

In a case in which the transmission beam 5-i is formed when the accommodation station transmission unit 10*sb* is applied, the transmission wavelength control unit 12*b* of the accommodation station transmission unit 10*sb* outputs, to the m×1 optical switches 16, the control signal to cause the input port that obtains light of the wavelength $\lambda_{Ti}$ from the optical demultiplexer 15 to be connected to the output port in Step Sa1 in FIG. 5.

Note that in FIG. 6, m light sources that generate light of wavelengths $\lambda_{T1}$ to $\lambda_{Tm}$, respectively, may be applied instead of the multiple-wavelength light source 14 and the optical demultiplexer 15 and each of them light sources may be connected to each of input ports of the m×1 optical switches 16.

In the wireless transmission system 90*t*1 according to the first embodiment described above, the accommodation station transmission unit 10*s* includes one optical modulator 11, and the optical modulator 11 modulates the light of the single wavelength $\lambda_{Ti}$ to generate an optical signal and outputs the generated optical signal based on the RF signal. The base station transmission unit 20 includes an optical demultiplexer 21, O/E converters 22-1 to 22-m, a matrix operation unit 23, and transmission antennas 24-1 to 24-n. The optical demultiplexer 21 includes a plurality of output ports allocated for each of wavelengths of light, obtains the optical signal output by the accommodation station transmission unit 10*s* from an input port, demultiplexes the obtained optical signal for each wavelength, and outputs the demultiplexed optical signals from the output ports corresponding to each wavelength. Each of the O/E converters 22-1 to 22-m is connected to the plurality of output ports of the optical demultiplexer 21, and the O/E converter 22-i converts the optical signal of the wavelength $\lambda_{Ti}$ output by the optical demultiplexer 21 into an electrical signal to demodulate the RF signal and outputs the demodulated RF signal. The matrix operation unit 23 includes first ports Fp23-1 to Fp23-m and second ports Sp23-1 to Sp23-n. Then, the matrix operation unit 23 uses each of the first ports Fp23-1 to Fp23-m as a reference port and performs, on signals received by the reference ports, a BFN matrix operation of making a phase changes that is different for each of positions of the reference ports and cause each of phases of signals output from the second ports Sp23-1 to Sp23-n to have a linear inclination. An output of each of the O/E converters 22-1 to 22-m is connected to each of the first ports Fp23-1 to Fp23-m, and the first port Fp23-i receives the RF signal output by the connected O/E converter 22-i. The transmission antennas 24-1 to 24-n are connected to each of the second ports Sp23-1 to Sp23-n of the matrix operation unit 23. The transmission antennas 24-1 to 24-n emit RF signals after the BFN matrix operation output from each of the second ports Sp23-1 to Sp23-n to form a transmission beam 5-i.

In the above-described wireless transmission system 90*t*1, in a case in which the reception terminal apparatus 9-1 that is a transmission destination of the transmitted RF signal is replaced with a different reception terminal apparatus 9-1, the transmission wavelength control unit 12*a* of the accommodation station transmission unit 10*sa* tries to provide, to the wavelength variable light source 13, a control signal to designate the wavelength $\lambda_{Tj}$ instead of the wavelength $\lambda_{Ti}$ (herein, it is assumed that j is any value from 1 to m and i≠j). In this manner, the RF signal is output from the O/E converter 22-*j*, and the j-th first port Fp23-*j* in the matrix operation unit 23 obtains the RF signal. Thus, a transmission beam 5-*j* is formed in a direction that is different from the direction of the transmission beam 5-*i*. In this manner, the different reception terminal apparatus 9-1 can receive the RF signal transmitted with the transmission beam 5-*j*. Further, the same applies to the case in which one reception terminal apparatus 9-1 moves. This is because each of the m wavelengths $\lambda_{T1}$ to $\lambda_{Tm}$ is associated with each of the m first ports Fp23-1 to Fp23-*m* of the matrix operation unit 23 in a fixed manner by the optical demultiplexer 21. In other words, it can be said that each of the m wavelengths $\lambda_{T1}$ to $\lambda_{Tm}$ and each of the m transmission beams 5-1 to 5-*m* are correlated in a one-to-one relationship. Thus, it is possible to switch the transmission beams 5-1 to 5-*n* to be formed by the base station transmission unit 20 by switching the wavelengths $\lambda_{T1}$ to $\lambda_{Tm}$ in the accommodation station transmission unit 10*s*.

In the aforementioned wireless transmission system 90*t*1, the accommodation station transmission unit 10*s* of the accommodation station apparatus 2 performs control to select the wavelength $\lambda_{Ti}$ of the optical signal to be modulated with the transmitted RF signal and it is not necessary to perform any control by the base station apparatus 1. Further, information regarding the distance of the downstream optical fiber 3-1 is also not needed, and the number of wavelengths used is limited to the number of the first ports Fp23-1 to Fp23-*m* of the matrix operation unit 23.

Further, the wireless transmission system 90*t*1 is configured to select the position of the first port of the matrix operation unit 23 to obtain the RF signal through the processing of designating the wavelength $\lambda_{Ti}$ to be generated by the wavelength variable light source 13 in the case of the accommodation station transmission unit 10*sa* illustrated in FIG. 4.

Figure 21:
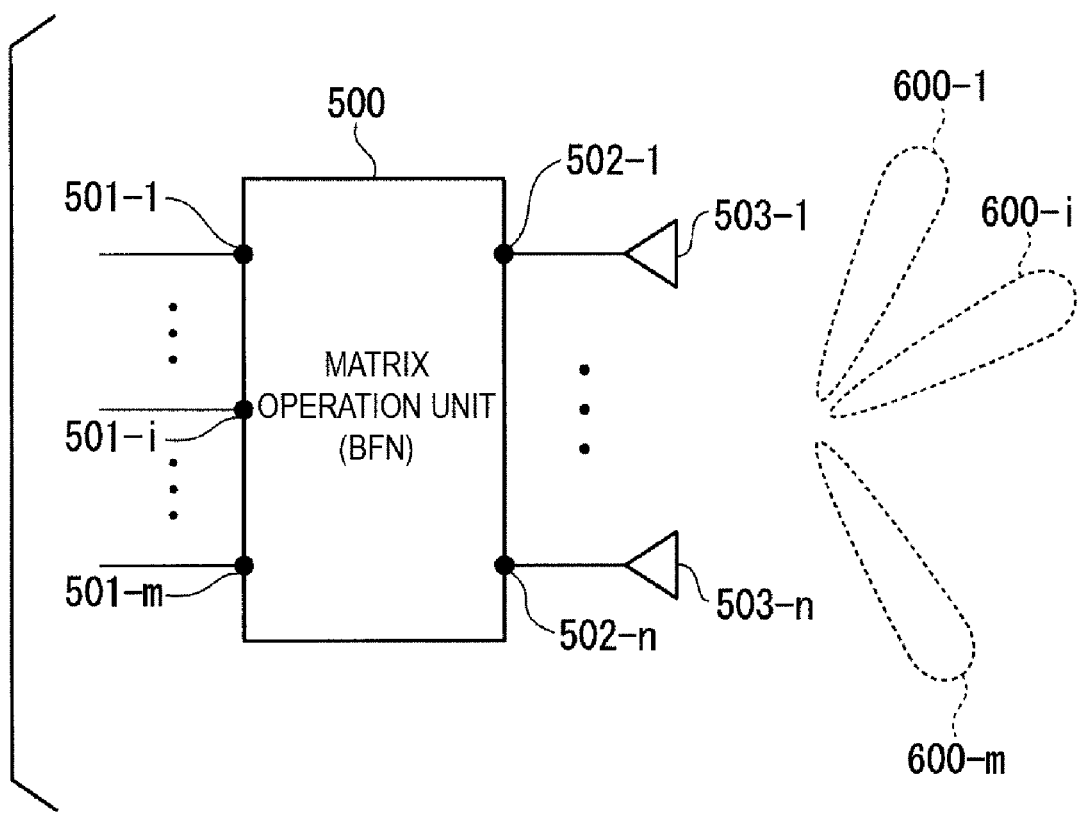
FIG. 21 is a diagram illustrating a beam forming method using BFN.

In a case in which an RoF transmission configuration is realized using the technique described in NPL 2, it is necessary to select one certain input port 501-*i* from among the plurality of input ports 501-1 to 501-*m* of the matrix operation unit 500 illustrated in FIG. 21 to send an RF signal to the selected input port 501-*i*. In this case, 1×m switches that are electrically switched are used, each of m input ports of the matrix operation unit 500 is connected to each of m output ports of the 1×m switches, and an RF signal is sent to one of the input ports of the 1×m switches. At this time, there is a problem that a loss occurs when the RF signal passes through the 1×m switches, and the loss typically increases as the value of m increases.

On the other hand, no switches are present in the configuration according to the first embodiment in a case of applying the accommodation station transmission unit 10*sa* illustrated in FIG. 4. Further, in a case in which the accommodation station transmission unit 10*sb* illustrated in FIG. 6 is applied, a configuration in which the positions of the first ports Fp23-1 to Fp23-*m* of the matrix operation unit 23 to receive RF signals are selected through processing of switching the m×1 optical switches 16 that are optically switched is employed.

Thus, it is possible to perform the switching with a low loss as compared with the processing of electrically switching the positions of the ports that receive the RF signals. Thus, it is possible to perform beam forming of transmission and reception antennas without using control of the base station apparatus 1 and information regarding the distance of the optical fiber while curbing degradation of wavelength utilization efficiency and an increase in cost.

Second Embodiment: Reception Side of Single Mode

Figure 7:
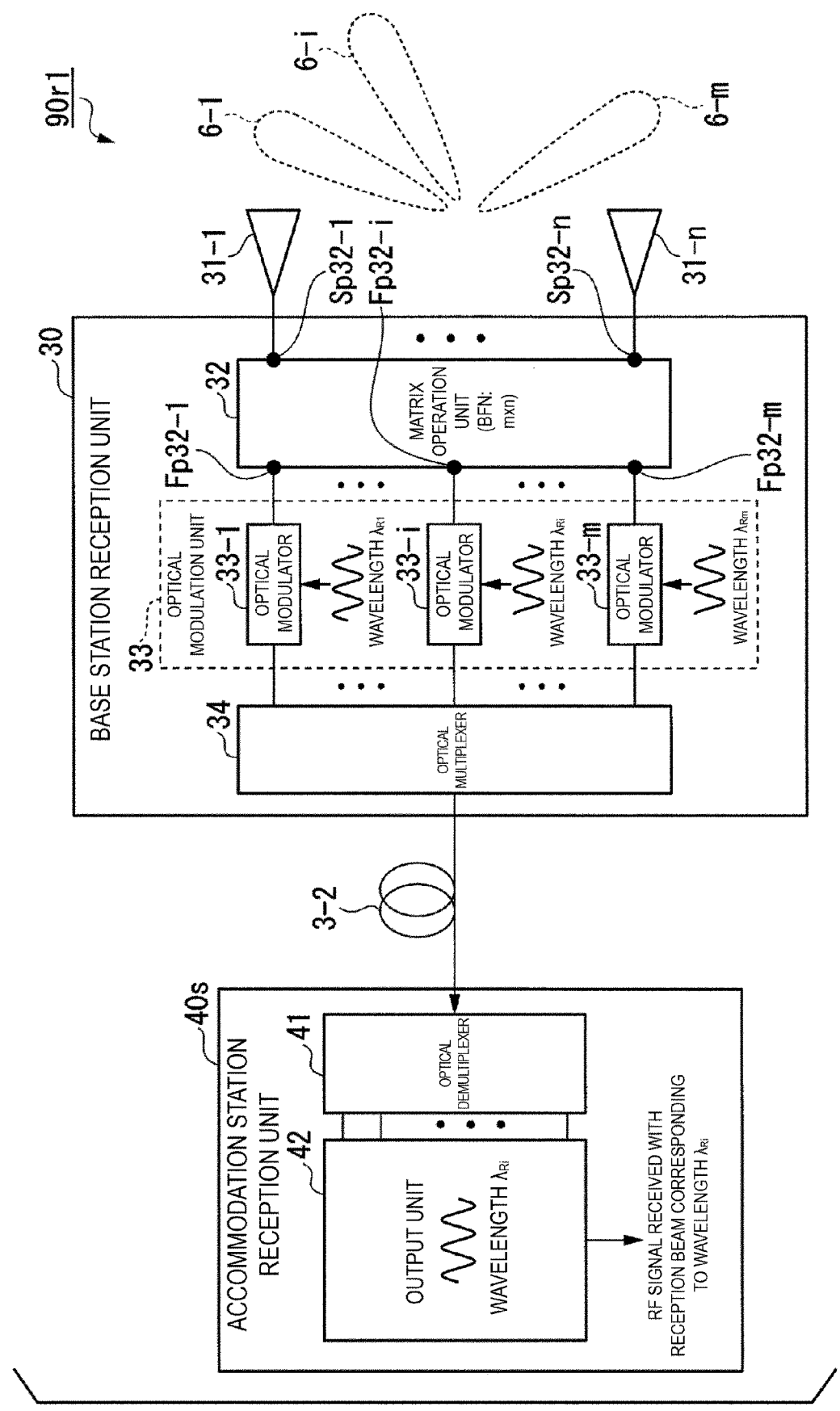
FIG. 7 is a block diagram illustrating a configuration of a wireless reception system according to a second embodiment.

FIG. 7 is a block diagram illustrating a configuration of a wireless reception system 90*r*1 according to a second embodiment. The wireless reception system 90*r*1 includes an accommodation station reception unit 40*s*, a base station reception unit 30, an upstream optical fiber 3-2, and a transmission terminal apparatus 9-2 illustrated in FIG. 2 although not illustrated in FIG. 7.

The base station reception unit 30 includes n reception antennas 31-1 to 31-*n*, a matrix operation unit 32, an optical modulation unit 33, and an optical multiplexer 34.

The reception antennas 31-1 to 31-*n* receive radio waves of RF signals transmitted by the transmission terminal apparatus 9-2 and output the received RF signals.

The matrix operation unit 32 has the same configuration as the matrix operation unit 23 according to the first embodiment other than that inputs and outputs of the RF signals are opposite. In other words, the matrix operation unit 32 is a functional unit that performs a BFN matrix operation and includes m first ports Fp32-1 to Fp32-*m* and n second ports Sp32-1 to Sp32-*n*. On the contrary to the first embodiment, each of the first ports Fp32-1 to Fp32-*m* is an output port to which each of the optical modulators 33-1 to 33-*m* is connected. Each of the second ports Sp32-1 to Sp32-*m* of the matrix operation unit 23 is an input port, to which each of the reception antennas 31-1 to 31-*n* is connected, and obtains an RF signal received and output by each of the reception antennas 31-1 to 31-*n*.

In a case in which any one of the first ports Fp32-1 to Fp32-*m* is used as a reference port similarly to the matrix operation unit 23, the matrix operation unit 32 performs, on the RF signal received by the reference port, a BFN matrix operation of making a phase change that is different for each position of the reference port and causes each of phases of RF signals output from then second ports Sp32-1 to Sp32-*n* to have a linear inclination.

On the other hand, in a case in which an RF signal is sent to each of the n second ports Sp32-1 to Sp32-*n*, the matrix operation unit 32 performs an inverse operation of the BFN matrix operation, that is, an operation of applying an inverse matrix on the RF signal received by each of the second ports Sp32-1 to Sp32-*n*. The matrix operation unit 32 outputs RF signals after the inverse operation of the BFN matrix operation from the m first ports Fp32-1 to Fp32-*m*.

The BFN matrix operation has reversibility. For example, it is assumed that a transmission beam 5-*i* illustrated in FIG. 3 is formed by giving an RF signal to the i-th first port Fp32-*i* of the matrix operation unit 32. For example, it is assumed that an RF signal with the same frequency as the frequency of the RF signal for forming the transmission beam 5-*i* has arrived in the direction of the transmission beam 5-*i*. The reversibility of the BFN matrix operation means that only the i-th first port Fp32-*i* outputs an RF signal if the reception antennas 31-1 to 31-*n* receive RF signals in the direction of the transmission beam 5-*i*, the RF signals are sent to the second ports Sp32-1 to Sp32-*n* of the matrix operation unit 32, and the matrix operation unit 32 performs an inverse operation of the BFN matrix operation. Thus, it is possible to form the reception beam 6-*i* by selecting the RF signal output from the i-th first port Fp32-*i*.

Figure 8:
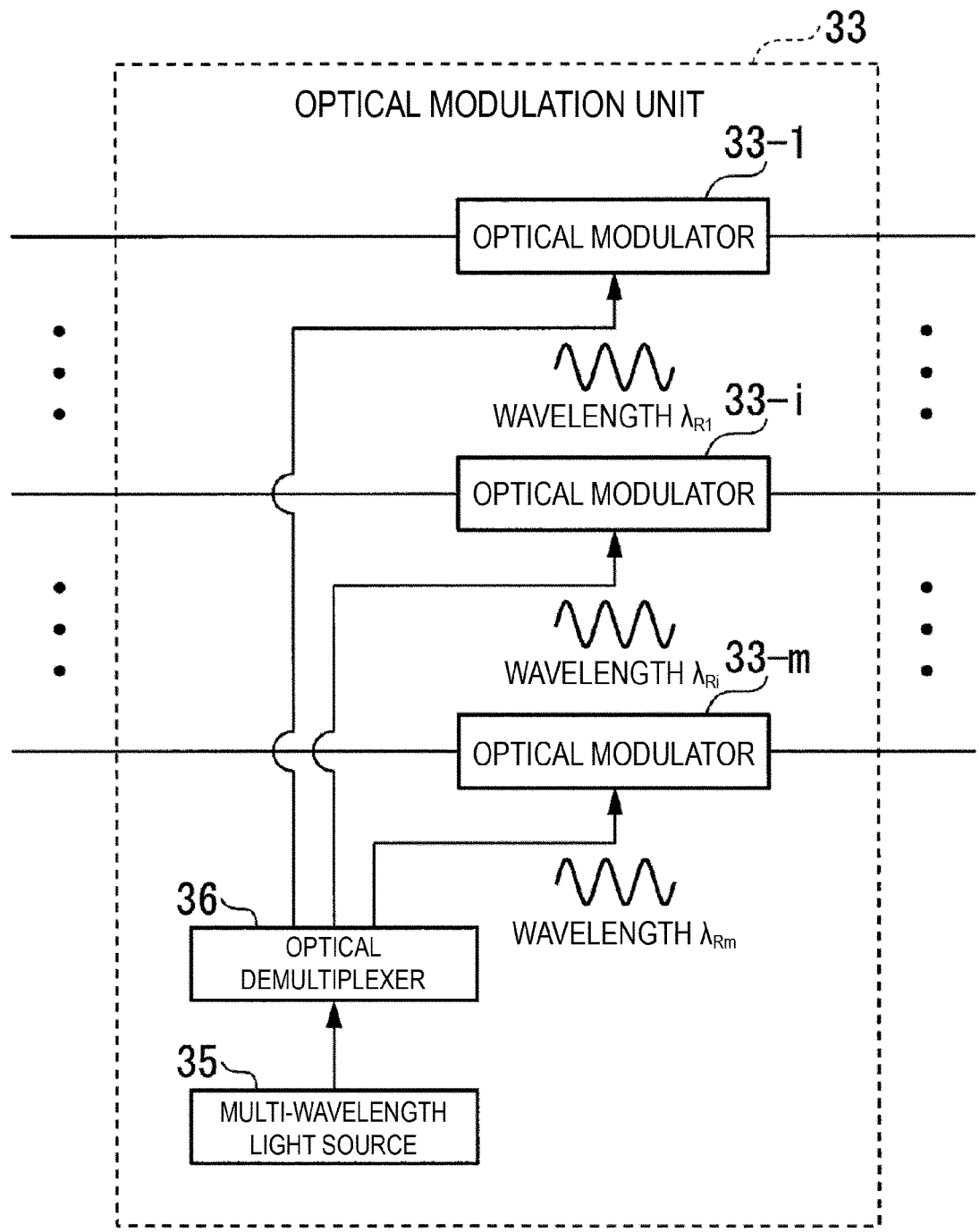
FIG. 8 is a block diagram illustrating an internal configuration of an optical modulation unit according to the second embodiment.

The optical modulation unit 33 includes an internal configuration illustrated in FIG. 8. The optical modulation unit 33 includes m optical modulators 33-1 to 33-$m$, an optical demultiplexer 36, and a multiple-wavelength light source 35. The multiple-wavelength light source 35 generates light of m different wavelengths $\lambda_{R1}$ to $\lambda_{Rm}$ and outputs the generated light to the optical demultiplexer 36. Here, each of the wavelengths $\lambda_{R1}$ to $\lambda_{Rm}$ may be a wavelength different from each of the wavelengths $\lambda_{T1}$ to $\lambda_{Tm}$ or may be the same wavelength as each of the wavelengths $\lambda_{T1}$ to $\lambda_{Tm}$.

The optical demultiplexer 36 includes one input port and m output ports. Each of the m output ports is allocated to each of the m wavelengths $\lambda_{R1}$ to $\lambda_{Rm}$ in a fixed manner and is connected to each of the optical modulators 33-1 to 33-$m$. The optical demultiplexer 36 demultiplexes light output by the multiple-wavelength light source 35 for each wavelength, and each of the demultiplexed light is branched and output to the optical modulators 33-1 to 33-$m$ connected to the output ports corresponding to each wavelength.

The optical modulators 33-1 to 33-$m$ obtain the RF signals output from each of the m first ports Fp32-1 to Fp32-$m$ of the matrix operation unit 32 to which each of the optical modulators 33-1 to 33-$m$ is connected. The optical modulators 33-1 to 33-$m$ perform intensity modulation with the obtained RF signals using the light of the wavelengths $\lambda_{R1}$ to $\lambda_{Rm}$ sent from the optical demultiplexer 36, respectively, as an optical carrier to generate optical signals and output the optical signals.

Note that in FIG. 8, m light sources that generate light of the wavelengths $\lambda_{T1}$ to $\lambda_{Tm}$ may be applied instead of the multiple-wavelength light source 35 and the optical demultiplexer 36, and each of the m light sources may be connected to each of the optical modulators 33-1 to 33-$m$. Alternatively, m direct optical modulators that generate light of the wavelengths $\lambda_{T1}$ to $\lambda_{Tm}$ may be used instead of the multiple-wavelength light source 35, the optical demultiplexer 36, and the optical modulators 33-1 to 33-$m$.

Returning to FIG. 7, the optical multiplexer 34 multiplexes m optical signals of the wavelengths $\lambda_{R1}$ to $\lambda_{Rm}$ output from each of the optical modulators 33-1 to 33-$m$ and outputs the optical signals to the upstream optical fiber 3-2. The upstream optical fiber 3-2 transmits, to the accommodation station reception unit 40$s$, an optical signal of the m multiplexed wavelengths $\lambda_{R1}$ to $\lambda_{Rm}$ output by the optical multiplexer 34.

The accommodation station reception unit 40$s$ includes an optical demultiplexer 41 and an output unit 42. The optical demultiplexer 41 includes one input port and m output ports, and each of the m output ports is allocated to each of the m wavelengths $\lambda_{R1}$ to $\lambda_{Rm}$ in a fixed manner. The optical demultiplexer 41 receives the optical signal transmitted by the upstream optical fiber 3-2 from the input port and demultiplexes the received optical signal for each wavelength. By the optical demultiplexer 41, each of the demultiplexed optical signals is branched and output to the output port corresponding to each wavelength.

The output unit 42 obtains the optical signals output by the optical demultiplexer 41 from the output ports and selects an optical signal corresponding to any one wavelength $\lambda_{Ri}$ from the optical signals obtained from the output ports. The output unit 42 converts the selected optical signal into an electrical signal to demodulate an RF signal and outputs the demodulated RF signal.

Figure 9:
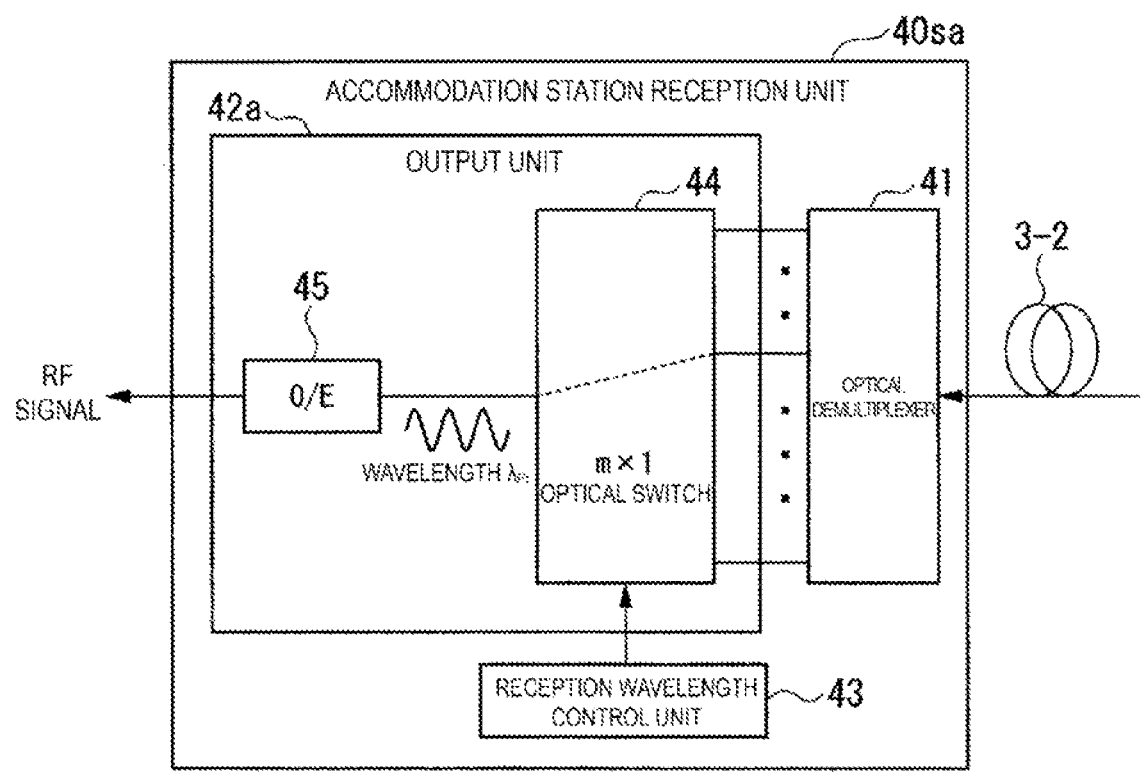
FIG. 9 is a block diagram illustrating an internal configuration of an accommodation station reception unit according to the second embodiment.

FIG. 9 is a block diagram illustrating an internal configuration of an accommodation station reception unit 40$sa$ that is an example of a specific configuration of the accommodation station reception unit 40$s$. Note that the optical demultiplexer 41 illustrated in FIG. 9 has the same configuration as the optical demultiplexer 41 in FIG. 7. The accommodation station reception unit 40$sa$ illustrated in FIG. 9 includes an optical demultiplexer 41, an output unit 42$a$, and a reception wavelength control unit 43. The output unit 42$a$ includes m×1 optical switches 44 and an O/E converter 45.

The m×1 optical switches 44 include m input ports and one output port, and each of the m input ports is connected to each of the m output ports of the optical demultiplexer 41. The m×1 optical switches 44 shift the switches and connect any one of the m input ports to the output port based on a control signal received from the reception wavelength control unit 43. The O/E converter 45 converts optical signals output by the m×1 optical switches 44 from the output ports into electrical signals to demodulate an RF signal and outputs the demodulated RF signal. The RF signals are RF signals received with the reception beam 6-$i$.

The reception wavelength control unit 43 outputs, to the m×1 optical switches 44, a control signal for connecting the input port that obtains, from the optical demultiplexer 41, the light of the one wavelength $\lambda_{Ri}$ on which the RF signal is superimposed to an output port. The wavelength $\lambda_{Ri}$ of the light on which the RF signal to be output is superimposed is switched by the reception wavelength control unit 43 switching the output port that is a connection destination of the input port of the m×1 optical switches 44 using the control signal.

Figure 10:
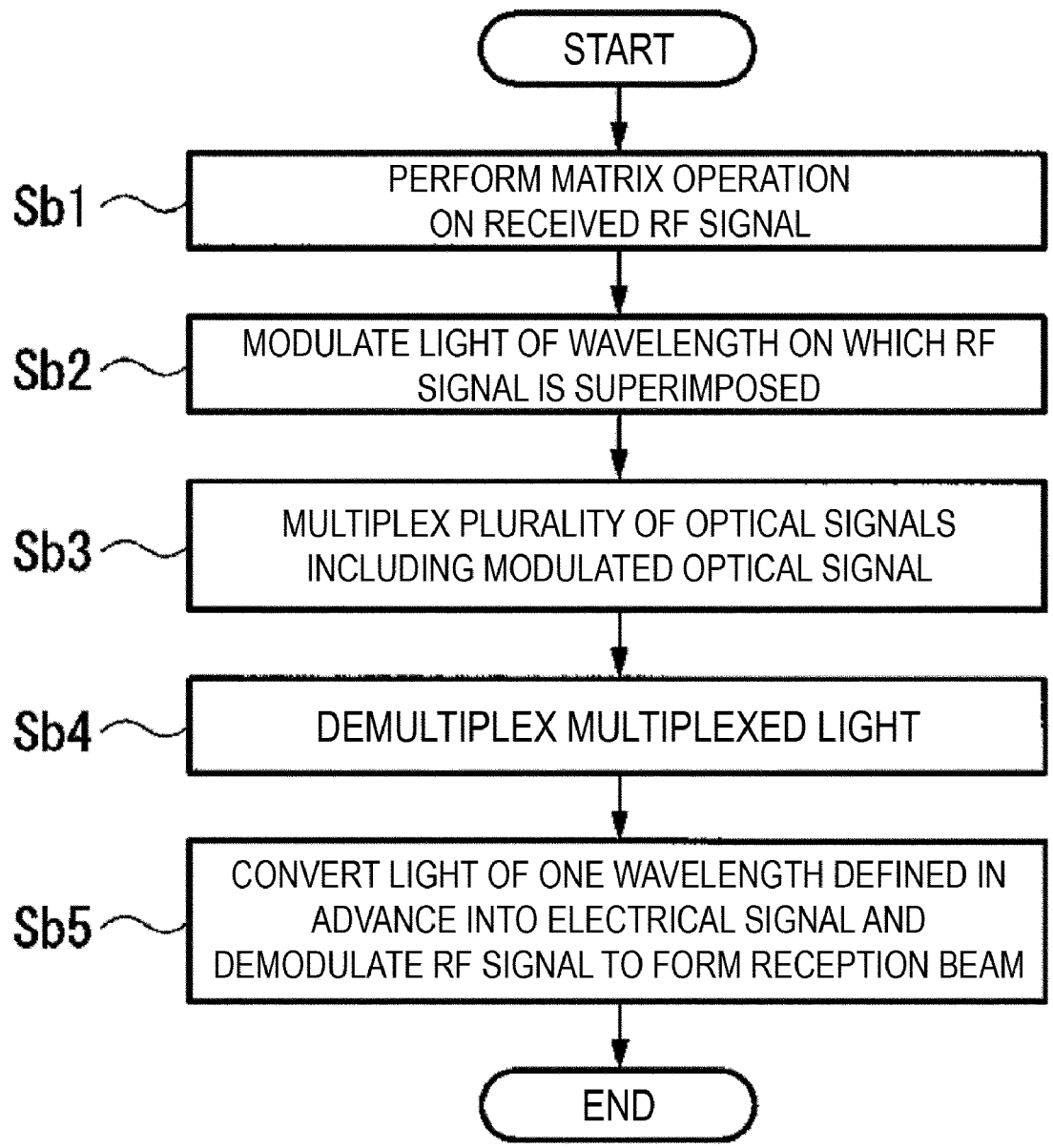
FIG. 10 is a flowchart illustrating a flow of processing performed by the wireless reception system according to the second embodiment.

Processing Performed by Wireless Reception System According to Second Embodiment FIG. 10 is a flowchart illustrating a flow of processing performed by the wireless reception system 90$r$1 according to the second embodiment. The following description will be given on the assumption that an accommodation station reception unit 40$sa$ illustrated in FIG. 9, for example, is included as the accommodation station reception unit 40$s$.

It is assumed that an RF signal transmitted by the transmission terminal apparatus 9-2 has arrived in the direction of the reception beam 6-$i$. The reception antennas 31-1 to 31-$n$ output the received RF signal to the second ports Sp32-1 to Sp32-$n$ of the matrix operation unit 32 to which each of the reception antennas 31-1 to 31-$n$ is connected. The matrix operation unit 32 performs an inverse operation of the BFN matrix operation on the RF signal sent to the second ports Sp32-1 to Sp32-$n$ and outputs an RF signal obtained as a result of the operation from the i-th first port Fp32-$i$ (Step Sb1).

At this time, the matrix operation unit 32 does not output anything from the first ports Fp32-1 to Fp32-($i$−1) and the first ports Fp32($i$+1) to Fp32-$m$. The optical modulator 33-$i$ performs intensity modulation with the RF signal output by the matrix operation unit 32 from the first port Fp32-$i$ using the light of the wavelength $\lambda_{Ri}$ provided from the optical demultiplexer 36 as an optical carrier to generate an optical signal and outputs the optical signal (Step Sb2).

The optical modulators 33-1 to 33-($i$−1) and 33-($i$+1) to 33-$m$ other than the optical modulator 33-$i$ output directly the light of the wavelengths $\lambda_{R1}$ to $\lambda_{R(i-1)}$ and $\lambda_{R(i+1)}$ to $\lambda_{Rm}$ provided from the optical demultiplexer 36 because the first ports Fp32-1 to Fp32-($i$−1) and the first ports Fp32-($i$+1) to Fp32-$m$ of the matrix operation unit 32 to which each of the optical modulators 33-1 to 33-($i$−1) and 33-($i$+1) to 33-$m$ is connected do not output anything.

The optical multiplexer 34 multiplexes the optical signal of the wavelength $\lambda R$ modulated with the RF signal output by the optical modulator 33-$i$, and the light of the wavelengths $\lambda_{R1}$ to $\lambda_{R(i-1)}$ and $\lambda_{R(i+1)}$ to $\lambda_{Rm}$ output by the optical modulators 33-1 to 33-($i$−1) to 33-($i$+1) to 33-$n$, and outputs the multiplexed optical signal to the upstream optical fiber 3-2 (Step Sb3).

The upstream optical fiber 3-2 transmits the optical signal multiplexed by the optical multiplexer 34 to the optical demultiplexer 41 of the accommodation station reception unit 40sa. The optical demultiplexer 41 demultiplexes the optical signal received from the upstream optical fiber 3-2 into m wavelengths $\lambda_{R1}$ to $\lambda_{Rm}$. By the optical demultiplexer 41, each of the demultiplexed optical signals is branched and output to the output port corresponding to the wavelength of the demultiplexed optical signal (Step Sb4).

The reception wavelength control unit 43 outputs, to the m×1 optical switches 44, a control signal to connect the input port of the m×1 optical switches 44 to be connected to the output port of the optical demultiplexer 41 allocated to the wavelength $\lambda_{Ri}$ to the output port of the m×1 optical switches 44. The m×1 optical switches 44 output the optical signal of the wavelength $\lambda_{Ri}$ from the output port by the m×1 optical switches 44 shifting the switches in response to the control signal.

The O/E converter 45 receives the optical signal of the wavelength $\lambda_{Ri}$ output by the m×1 optical switches 44 from the output port, converts the received optical signal into an electrical signal to demodulate the RF signal, and outputs the demodulated RF signal (Step Sb5). This means that the reception beam 6-i is formed because the Rf signal arriving from the direction of the reception beam 6-i has been subjected to same phase synthesis.

Figure 11:
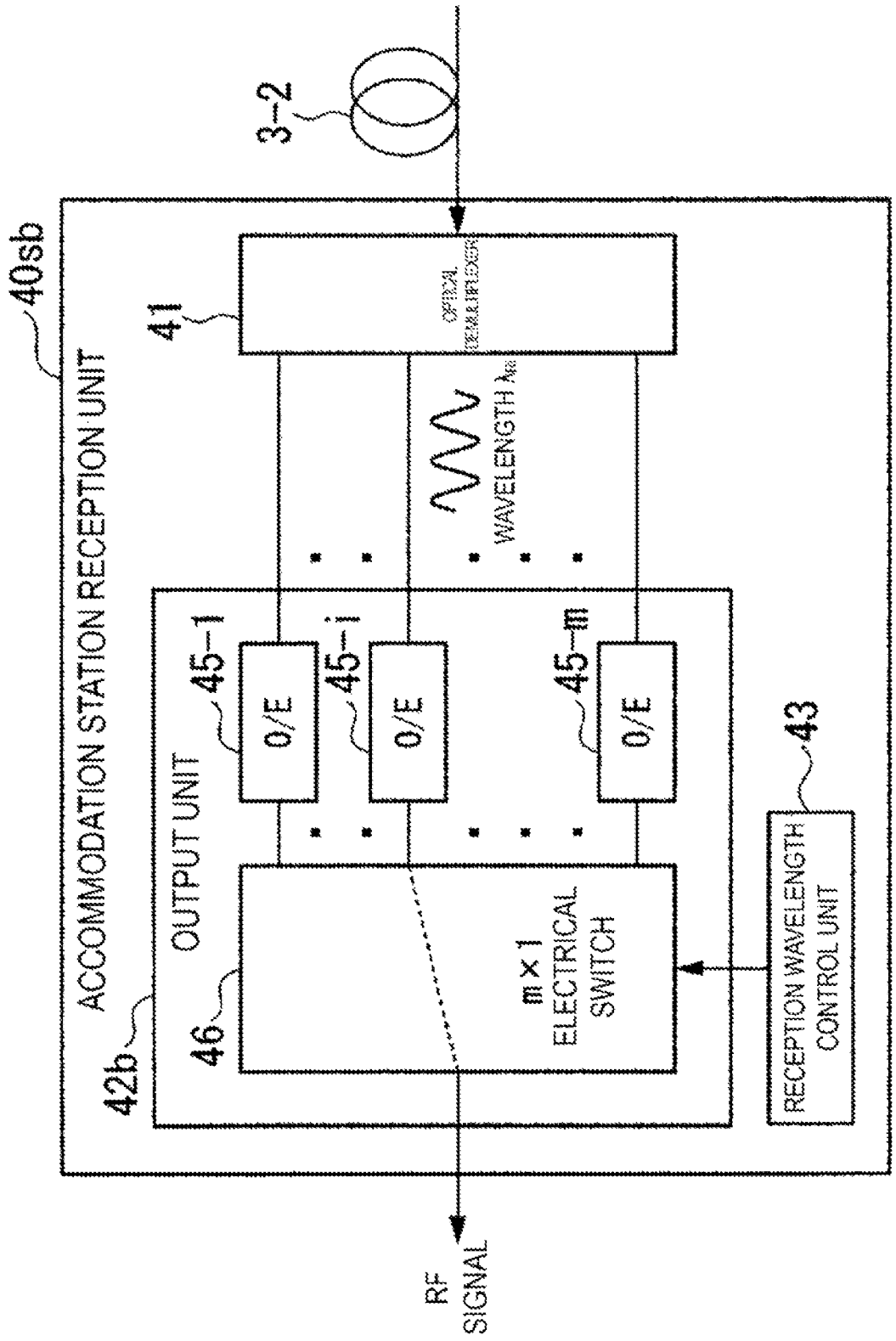
FIG. 11 is a block diagram illustrating an internal configuration in another configuration example of the accommodation station reception unit according to the second embodiment.

Another Configuration Example of Accommodation Station Reception Unit According to Second Embodiment Note that the accommodation station reception unit 40sb illustrated in FIG. 11 may be applied as the accommodation station reception unit 40s instead of the accommodation station reception unit 40sa illustrated in FIG. 9. The accommodation station reception unit 40sb illustrated in FIG. 11 includes an optical demultiplexer 41, an output unit 42b, and a reception wavelength control unit 43. Note that the optical demultiplexer 41 illustrated in FIG. 11 has the same configuration as the optical demultiplexer 41 in FIG. 7, and the reception wavelength control unit 43 has the same configuration as the reception wavelength control unit 43 illustrated in FIG. 9.

The output unit 42b includes m O/E converters 45-1 to 45-m and m×1 electric switches 46. Each of them O/E converters 45-1 to 45-m is connected to each of m output ports of the optical demultiplexer 41 and converts and outputs optical signals of the wavelengths $\lambda_{R1}$ to $\lambda_{Rm}$ output from each of the m output ports of the optical demultiplexer 41 into electrical signals.

The m×1 electric switches 46 include m input ports and one output port, and each of the m input ports is connected to each of the m O/E converters 45-1 to 45-n. The m×1 electric switches 46 shift the switches based on the control signal received from the reception wavelength control unit 43 and connect any one of the m input ports to the output port.

In other words, the accommodation station reception unit 40sa illustrated in FIG. 9 selects the wavelength $\lambda_{Ri}$ of the light to be output first using the m×1 optical switches 44, and the O/E converter 45 then performs conversion into an electrical signal. On the other hand, the accommodation station reception unit 40sb illustrated in FIG. 11 is configured such that the optical signals are converted into electrical signals using the m O/E converters 45-1 to 45-m first and the wavelength $\lambda_{Ri}$ of the light to be output is then selected using the m+1 electric switches 46. Thus, the wavelength $\lambda_{Ri}$ of the light on which the RF signal to be output is superimposed is switched by the reception wavelength control unit 43 switching the output port as a connecting destination of the input port of the m×1 electric switches 46 using the control signal even in the accommodation station reception unit 40sb similarly to the accommodation station reception unit 40sa.

If an RF signal arrives from the direction of the reception beam 6-i in a case in which the accommodation station reception unit 40sb is applied, the reception wavelength control unit 43 of the accommodation station reception unit 40sb outputs, to the m×1 electric switches 46, a control signal to connect the input port to receive the electrical signal output by the O/E converter 45-i to the output port in Step Sb5 in FIG. 10.

Note that in a case in which an RF signal arrives in a direction other than the directions of the reception beams 6-1 to 6-m in the aforementioned wireless reception system 90r1, each of them first ports Fp32-1 to Fp32-m of the matrix operation unit 32 outputs an RF signal with a different amplitude and a different phase from those of the original RF signal.

In this case, the RF signal with the different amplitude and the different phase is sent to each of the optical modulators 33-1 to 33-m. Each of the optical modulators 33-1 to 33-m generates optical signals of the wavelengths $\lambda_{R1}$ to $\lambda_{Rm}$ modulated with the RF signal sent to each of the optical modulators 33-1 to 33-m. From a different viewpoint, RF signals are separately superimposed on the optical signals of the plurality of wavelengths $\lambda_{R1}$ to $\lambda_{Rm}$. Thus, the output unit 42 of the accommodation station reception unit 40s is required to perform processing of demodulating the RF signals on the plurality of optical signals output by the optical demultiplexer 41 from the plurality of output ports as targets. For example, the output unit 42 of the accommodation station reception unit 40s performs electrical conversion on each of the optical signals demultiplexed and output by the optical demultiplexer 41 for each wavelength and demodulates the RF signal superimposed on each of the optical signals. The output unit 42 may select and output the RF signal with the largest power from among the demodulated RF signals, or may adjust the amplitudes and the phases of the plurality of demodulated RF signals to perform maximum ratio combining, and output the result.

In the wireless reception system 90r1 according to the second embodiment described above, the base station reception unit 30 includes reception antennas 31-1 to 31-n, optical modulators 33-1 to 33-m, and an optical multiplexer 34, and the reception antennas 31-1 to 31-n receive RF signals with a reception beam 6-i. The matrix operation unit 32 includes first ports Fp32-1 to Fp32-m and second ports Sp32-1 to Sp32-n. Further, the matrix operation unit 32 uses each of the first ports Fp32-1 to Fp32-m as a reference port and performs, on signals obtained by the reference ports, a BFN matrix operation of making a phase change that is different for each of positions of the reference ports and cause each of phases of signals output from the second ports Sp32-1 to Sp32-n to have a linear inclination. The reception antennas 31-1 to 31-n are connected to each of the second ports Sp32-1 to Sp32-n, and each of the second ports Sp32-1 to Sp32-n obtains the RF signal received with the reception beam 6-i. The optical modulators 33-1 to 33-m are connected to the first ports Fp32-1 to Fp32-m of the matrix operation unit 32, respectively, and light of different wavelengths $\lambda_{T1}$ to $\lambda_{Rm}$ is given to each of the optical modulators 33-1 to 33-m. Then, the optical modulator 33-i modulates the given light of the wavelength $\lambda_{Ti}$ to generate an optical signal based on the RF signal obtained through an inverse operation of the BFN matrix operation output from the first port Fp32-i. The optical multiplexer 34 multiplexes optical signals generated by the optical modulators 3-1 to 33-*m* and outputs the multiplexed optical signal. The accommodation station reception unit 40*s* includes an optical demultiplexer 41 and output units 42*a* and 42*b*, and the optical demultiplexer 41 obtains the optical signal output by the optical multiplexer 34 and demultiplexes the optical signal for each wavelength. The output units 42*a* and 42*b* convert the optical signal of the wavelength $\lambda_{Ri}$ included in the optical signal output by the optical demultiplexer 41 into an electrical signal to demodulate the RF signal and output the demodulated RF signal.

In the wireless reception system 90*r*1 described above, it is assumed that the transmission terminal apparatus 9-2 that transmits a radio wave of the RF signal serves as the different transmission terminal apparatus 9-2 and the RF signal has arrived from a direction of the reception beam 6-*j* that is different from the reception beam 6-*i*. (Here, it is assumed that j is any value from 1 to m and i≠j.) In this case, the accommodation station reception unit 40*s* can receive the RF signal with the reception beam 6-*j* by selecting the wavelength $\lambda_{Rj}$. A desired RF signal can be obtained merely by selecting any of the wavelengths $\lambda_{R1}$ to $\lambda_{Rm}$ in this manner because each of the m wavelengths $\lambda_{R1}$ to $\lambda_{Rm}$ is correlated with each of the m first ports Fp32-1 to Fp32-*m* of the matrix operation unit 32 by the optical multiplexer 34 and the optical demultiplexer 41 in a fixed manner. In other words, it can be said that each of the m wavelengths $\lambda_{T1}$ to $\lambda_{Rm}$ and each of the m reception beams 6-1 to 6-*m* are correlated in a one-to-one relationship. Thus, it is possible to switch the reception beams 6-1 to 6-*m* merely by switching the wavelengths $\lambda_{R1}$ to $\lambda_{Rm}$ in the accommodation station reception unit 40*s*.

In the wireless reception system 90*r*1 described above, the accommodation station reception unit 40*s* of the accommodation station apparatus 2 performs only control to select the wavelength $\lambda_{Ti}$ of the optical signal on which the RF signal to be demodulated is superimposed, and it is not necessary for the base station apparatus 1 to perform any control. Further, information regarding the distance of the upstream optical fiber 3-2 is not needed, and the number of wavelengths to be used is limited to the number of first ports Fp32-1 to Fp32-*m* of the matrix operation unit 32.

In a case in which an RoF reception configuration is realized using the technique described in NPL 2, it is necessary to obtain the RF signal received by selecting one certain input port 501-*i* from among the plurality of input ports 501-1 to 501-*m* of the matrix operation unit 500 with an input and an output of the matrix operation unit 500 illustrated in FIG. 21 reversed. In this case, 1×m switches that are electrically switched are used, and each of the m input ports 501-1 to 501-*m* of the matrix operation unit 500 is connected to each of the m input ports of the 1×m switches. At this time, there is a problem that a loss occurs when the RF signal passes through the 1×m switches and the loss typically increases as the value of m increases.

On the other hand, the wireless reception system 90*r*1 is configured to select the positions of the first ports Fp32-1 to Fp32-*m* of the matrix operation unit 32 to output the RF signal through processing of switching the m×1 optical switches 44 to be optically switched in the accommodation station reception unit 40*sa* illustrated in FIG. 9. It is thus possible to perform the switching with a low loss as compared with processing of electrically switching the positions of the ports to output the RF signal.

In the case of the accommodation station reception unit 40*sb* illustrated in FIG. 11, a configuration in which the positions of the first ports Fp32-1 to Fp32-*m* of the matrix operation unit 32 to output the RF signal is selected through processing of switching the m×1 electrical switches 46 is employed.

Third Embodiment: Transmission Side of Multi-Mode

Figure 12:
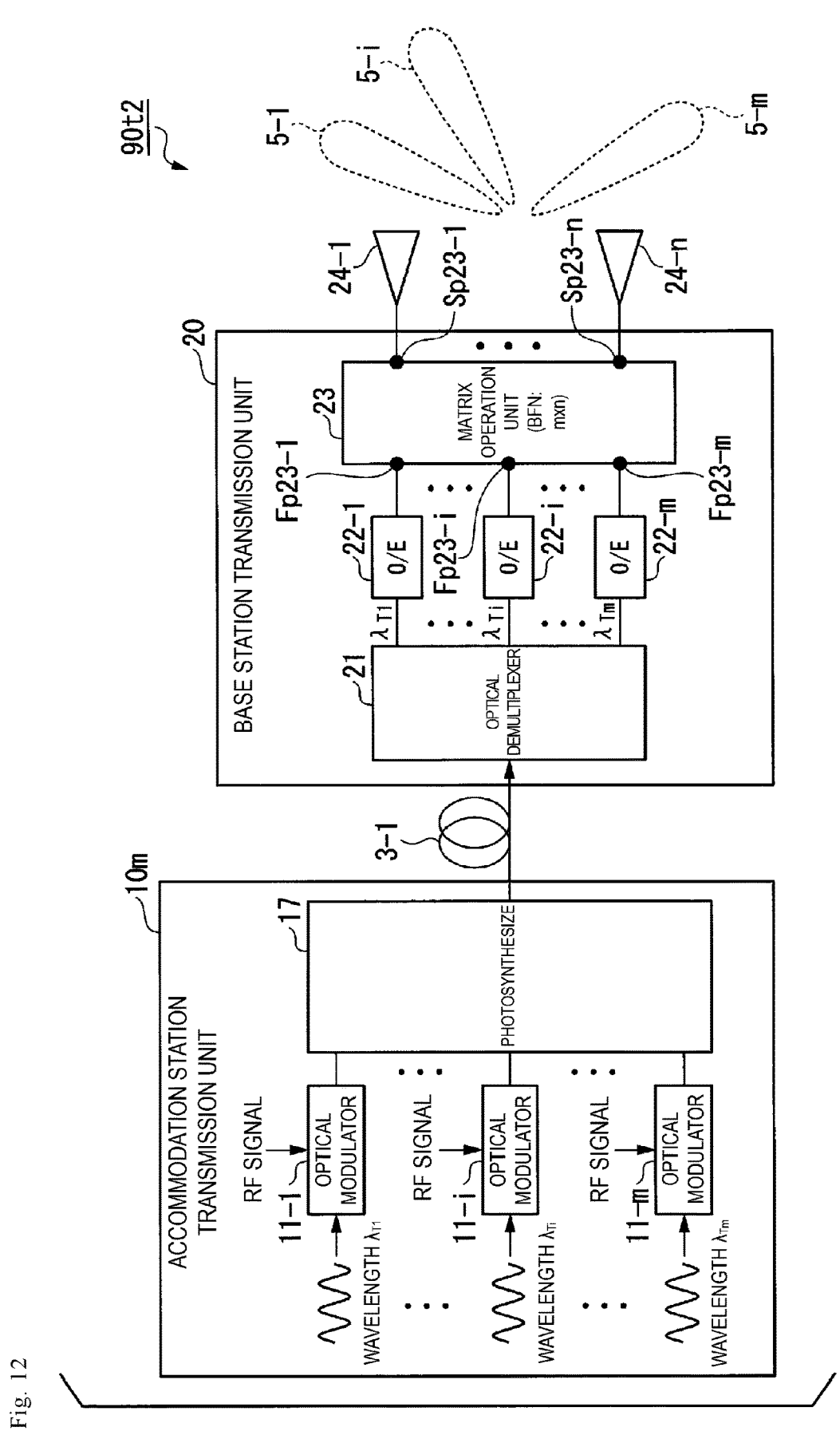
FIG. 12 is a block diagram illustrating a configuration of a wireless transmission system according to a third embodiment.

FIG. 12 is a block diagram illustrating a configuration of a wireless transmission system 90*t*2 according to a third embodiment. In FIG. 12, the same reference signs will be applied to the same configurations as those in FIG. 3, and different configurations will be described below. The wireless transmission system 90*t*2 includes an accommodation station transmission unit 10*m*, a base station transmission unit 20, a downstream optical fiber 3-1, and reception terminal apparatuses 9-1 illustrated in FIG. 2 although not illustrated in FIG. 12. Here, it is assumed that m reception terminal apparatuses 9-1 are present and will be referred to as reception terminal apparatuses 9-1-1 to 9-1-*m*.

Figure 13:
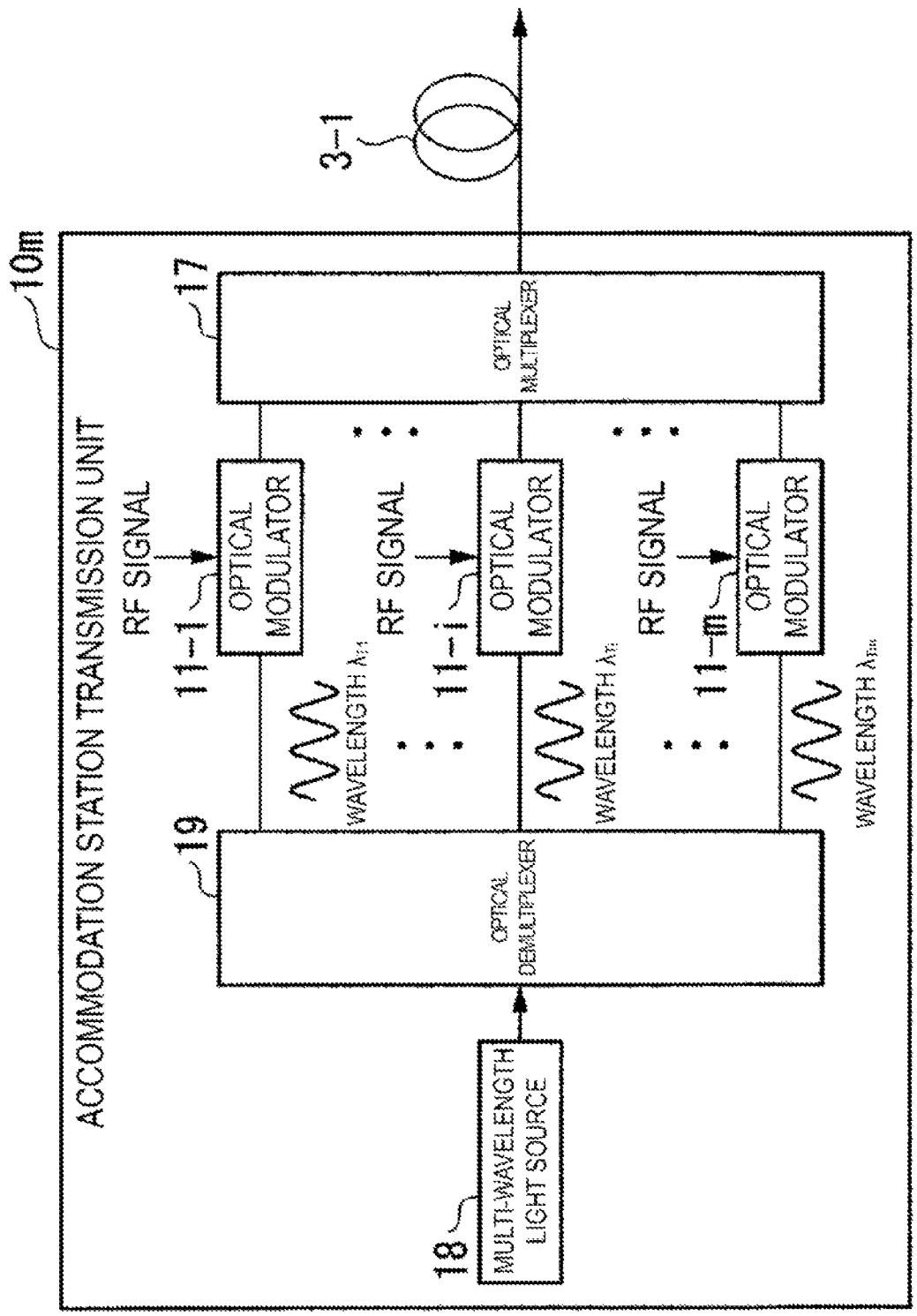
FIG. 13 is a block diagram illustrating an internal configuration of an accommodation station transmission unit according to the third embodiment.

The accommodation station transmission unit 10*m* has an internal configuration illustrated in FIG. 13. The accommodation station transmission unit 10*m* includes a multiple-wavelength light source 18, an optical demultiplexer 19, m optical modulators 11-1 to 11-*m*, and an optical multiplexer 17. The multiple-wavelength light source 18 generates and outputs light of wavelengths $\lambda_{T1}$ to $\lambda_{Tm}$. The optical demultiplexer 19 includes one input port and m output ports, and each of the m output ports is allocated to each of the m wavelengths $\lambda_{T1}$ to $\lambda_{Tm}$ in a fixed manner. The optical demultiplexer 19 demultiplexes the light of the wavelengths $\lambda_{T1}$ to $\lambda_{Tm}$ output by the multiple-wavelength light source 18 for each of the wavelengths, and each of the demultiplexed light is branched and output to the output port corresponding to each wavelength.

Each of the optical modulators 11-1 to 11-*m* is connected to the m output ports of the optical demultiplexer 19. Each of the optical modulators 11-1 to 11-*m* obtains RF signals of different transmission destinations, for example. Each of the optical modulators 11-1 to 11-*m* obtains the light of the wavelengths $\lambda_{T1}$ to $\lambda_{Tm}$ output from the output port of the optical demultiplexer 19 to which each of the optical modulators 11-1 to 11-*m* is connected. Each of the optical modulators 11-1 to 11-*m* performs, using the obtained light as an optical carrier, intensity modulation with the RF signal obtained by each of the optical modulators 11-1 to 11-*m* to generate an optical signal and outputs the generated optical signal. The optical multiplexer 17 multiplexes the m optical signals generated by the optical modulators 11-1 to 11-*m* and outputs the multiplexed optical signal to the downstream optical fiber 3-1.

Figure 14:
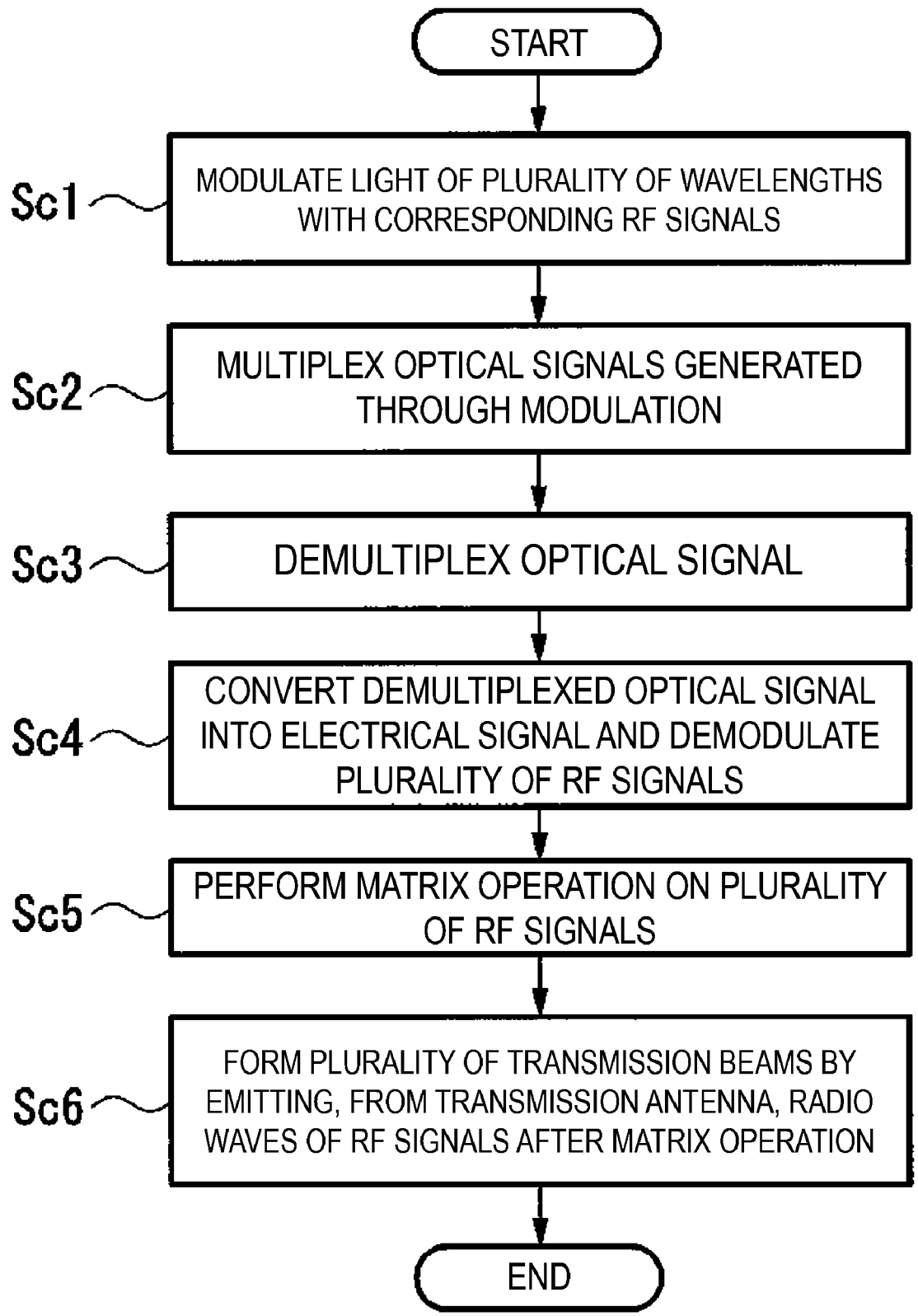
FIG. 14 is a flowchart illustrating a flow of processing performed by the wireless transmission system according to the third embodiment.

Processing Performed by Wireless Transmission System According to Third Embodiment FIG. 14 is a flowchart illustrating a flow of processing performed by the wireless transmission system 90*t*2 according to a third embodiment. The multiple-wavelength light source 18 of the accommodation station transmission unit 10*m* generates and outputs light of wavelengths $\lambda_{T1}$ to $\lambda_{Tm}$. The optical demultiplexer 19 demultiplexes the light of the wavelengths $\lambda_{T1}$ to $\lambda_{Tm}$ output by the multiple-wavelength light source 18 for each of the wavelengths, and each of the demultiplexed light is branched and output to the output port corresponding to each wavelength.

Each of the optical modulators 11-1 to 11-*m* performs intensity modulation with RF signals of different transmission destinations obtained by each of the optical modulators 11-1 to 11-*m* to generate optical signals using, as an optical carrier, the light of the wavelength $\lambda_{T1}$ to $\lambda_{Tm}$ output from the output port of optical demultiplexer 19 to which each of the optical modulators 11-1 to 11-m is connected. The optical modulators 11-1 to 11-m output the generated optical signals to the optical multiplexer 17 (Step Sc1).

The optical multiplexer 17 multiplexes the m optical signals output by the optical modulators 11-1 to 11-m and outputs the multiplexed optical signal to the downstream optical fiber 3-1 (Step Sc2). The downstream optical fiber 3-1 transmits the optical signal output by the optical multiplexer 17 to the optical demultiplexer 21 of the base station transmission unit 20. The optical demultiplexer 21 demultiplexes the optical signal received from the downstream optical fiber 3-1 into m wavelengths $\lambda_{T1}$ to $\lambda_{Tm}$. By the optical demultiplexer 21, each of the demultiplexed optical signals is branched to the output port corresponding to the wavelength and output to the O/E converters 22-1 to 22-m connected to the output ports (Step Sc3).

Each of the O/E converters 22-1 to 22-m converts each of the optical signals of the wavelengths $\lambda_{T1}$ to $\lambda_{Tm}$ branched and output by the optical demultiplexer 21 into an electrical signal and demodulates the RF signal (Step Sc4). Each of the O/E converters 22-1 to 22-m outputs the demodulated RF signal to the first ports Fp23-1 to Fp23-m of the matrix operation unit 23 connected to each of the O/E converters 22-1 to 22-m. The matrix operation unit 23 performs a BFN matrix operation on each of the RF signals obtained by the first ports Fp23-1 to Fp23-m. The matrix operation unit 23 outputs n RF signals obtained as a result of the BFN matrix operation from each of the second ports Sp23-1 to Sp23-n (Step Sc5).

The transmission antennas 24-1 to 24-n connected to each of the second ports Sp23-1 to Sp23-n emit radio waves of the RF signals output by each of the second ports Sp23-1 to Sp23-n. In this manner, the transmission beams 5-1 to 5-m in mutually different directions in accordance with the positions of the first ports Fp23-1 to Fp23-m are formed. In other words, multi-beams including m transmission beams 5-1 to 5-m are formed (Step Sc6).

Each of the m reception terminal apparatuses 9-1-1 to 9-1-m receives and obtains the RF signal transmitted with the transmission beams 5-1 to 5-m, respectively.

In the wireless transmission system 90t2 according to the third embodiment described above, the accommodation station transmission unit 10m includes the optical modulators 11-1 to 11-m and the optical multiplexer 17, and light of mutually different wavelengths $\lambda_{T1}$ to $\lambda_{Tm}$ is given to each of the optical modulators 11-1 to 11-m. Each of the optical modulators 11-1 to 11-m modulates light given to each of the optical modulators 11-1 to 11-m to generate an optical signal based on the RF signal, and the optical multiplexer 17 multiplexes and outputs the optical signals generated by the optical modulators 11-1 to 11-m. The base station transmission unit 20 includes an optical demultiplexer 21, O/E converters 22-1 to 22-m, a matrix operation unit 23, and transmission antennas 24-1 to 24-n. The optical demultiplexer 21 includes a plurality of output ports allocated to each of the wavelengths of the light, receives the optical signal output by the accommodation station transmission unit 10m from the input port, demultiplexes the received optical signal for each of the wavelengths, and outputs the demultiplexed optical signals from the output ports corresponding to each wavelength. Each of the O/E converters 22-1 to 22-m is connected to the plurality of output ports of the optical demultiplexer 21, converts the optical signal output by the optical demultiplexer 21 into an electrical signal to demodulate the RF signal, and outputs the demodulated RF signal. The matrix operation unit 23 includes first ports Fp23-1 to Fp23-m and second ports Sp23-1 to Sp23-n. Then, the matrix operation unit 23 uses each of the first ports Fp23-1 to Fp23-m as a reference port and performs, on signals obtained by the reference ports, a BFN matrix operation of making a phase change that is different for each of positions of the reference ports and cause each of phases of signals output from the second ports Sp23-1 to Sp23-n to have a linear inclination. Each of outputs of the O/E converters 22-1 to 22-m is connected to each of the first ports Fp23-1 to Fp23-m, and each of the first ports Fp23-1 to Fp23-m receives the RF signal output by the O/E converters 22-1 to 22-m to which each of the first ports Fp23-1 to Fp23-m is connected. The transmission antennas 24-1 to 24-n are connected to each of the second ports Sp23-1 to Sp23-n of the matrix operation unit 23. The transmission antennas 24-1 to 24-n form the transmission beams 5-1 to 5-m through emission of the RF signal after the BFN matrix operation output by each of the second ports Sp23-1 to Sp23-n.

In the wireless transmission system 90t2 described above, each of the m wavelengths $\lambda_{T1}$ to $\lambda_{Tm}$ is correlated with each of the transmission antennas 24-1 to 24-m in a fixed manner by the optical multiplexer 17 and the optical demultiplexer 21. In other words, it can be said that each of the m wavelengths $\lambda_{T1}$ to $\lambda_{Tm}$ and each of the m transmission beams 5-1 to 5-m are correlated in a one-to-one relationship. Thus, it is possible to form multi-beams, that is, m transmission beams 5-1 to 5-n by performing modulation with the m RF signals using the light of the m wavelengths $\lambda_{T1}$ to $\lambda_{Tm}$ as an optical carrier and generating the m optical signals, in the accommodation station transmission unit 10m.

In the wireless transmission system 90t2 described above, the base station apparatus 1 is not required to perform any control. Further, information regarding the distance of the downstream optical fiber 3-1 is also not needed, and the number of wavelengths used is limited to the number of first ports Fp23-1 to Fp23-m of the matrix operation unit 23. Further, a configuration of electrically shifting switches is also not included. It is thus possible to perform beam forming of transmission and reception antennas without using control of the base station apparatus and information regarding the distance of the optical fiber while curbing degradation of wavelength utilization efficiency and an increase in cost.

Fourth Embodiment: Reception Side of Multi-Mode

Figure 15:
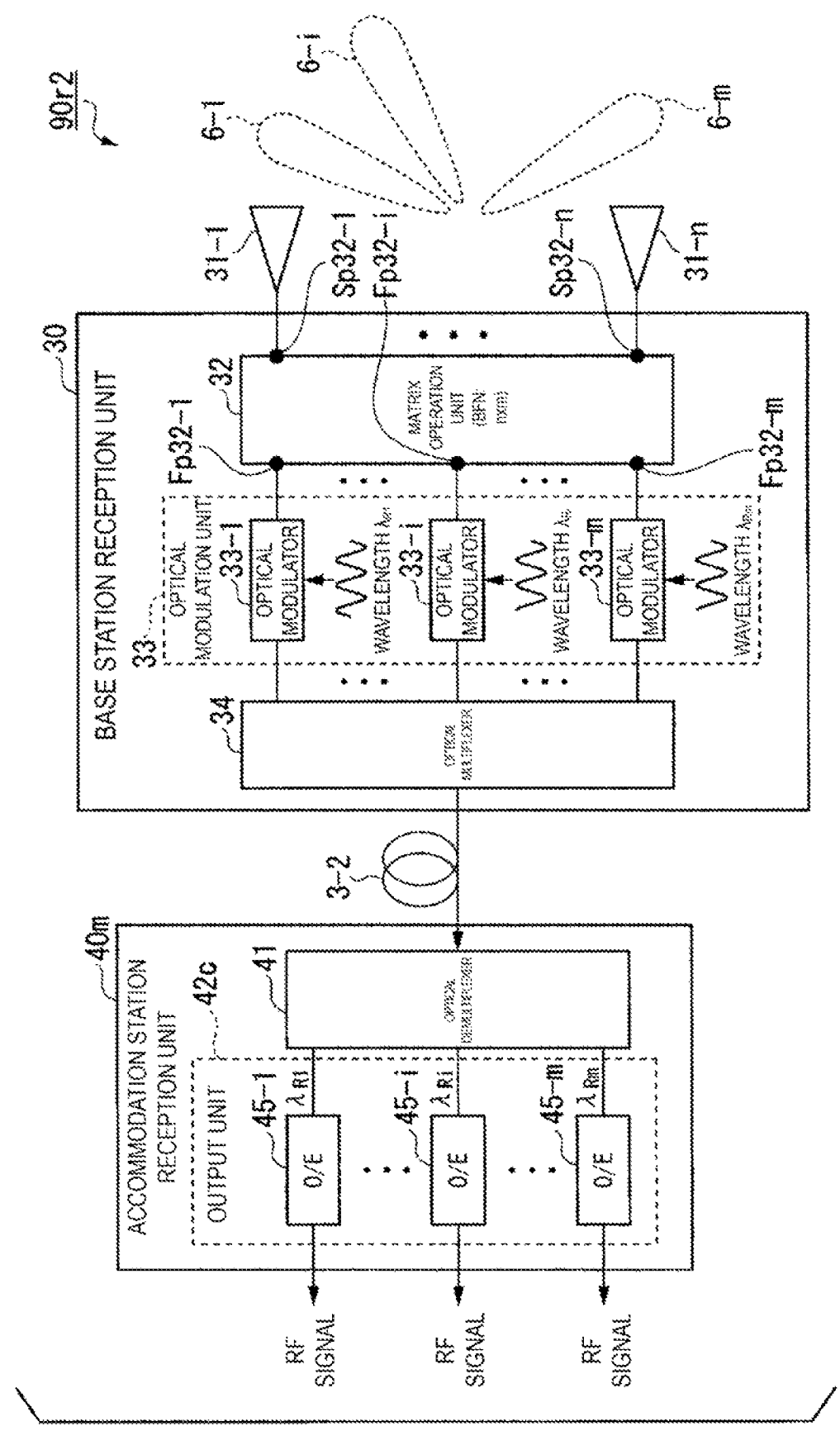
FIG. 15 is a block diagram illustrating a configuration of a wireless reception system according to a fourth embodiment.

FIG. 15 is a block diagram illustrating a configuration of a wireless reception system 90r2 according to a fourth embodiment. In FIG. 15, the same reference signs will be applied to the same configurations as those in FIG. 7, and different configurations will be described below.

The wireless reception system 90r2 includes an accommodation station reception unit 40m, a base station reception unit 30, an upstream optical fiber 3-2, and transmission terminal apparatuses 9-2 illustrated not in FIG. 2 although not illustrated in FIG. 15. Here, it is assumed that m transmission terminal apparatuses 9-2 are present and will be referred to as transmission terminal apparatuses 9-2-1 to 9-2-m.

The accommodation station reception unit 40m includes an optical demultiplexer 41 and an output unit 42c, and the output unit 42c includes m O/E converters 45-1 to 45-m. Each of the m O/E converters 45-1 to 45-m is connected to each of the m output ports of the optical demultiplexer 41. The optical demultiplexer 41 demultiplexes optical signals of m wavelengths $\lambda_{R1}$ to $\lambda_{Rm}$ transmitted through the upstream optical fiber 3-2, and each of the demultiplexed optical signals is branched and output to the output port corresponding to each wavelength. Each of the m O/E converters 45-1 to 45-m receives an optical signal output by the optical demultiplexer 41 from each of the m output ports, converts the received optical signal into an electrical signal, and demodulates and outputs an RF signal.

Figure 16:
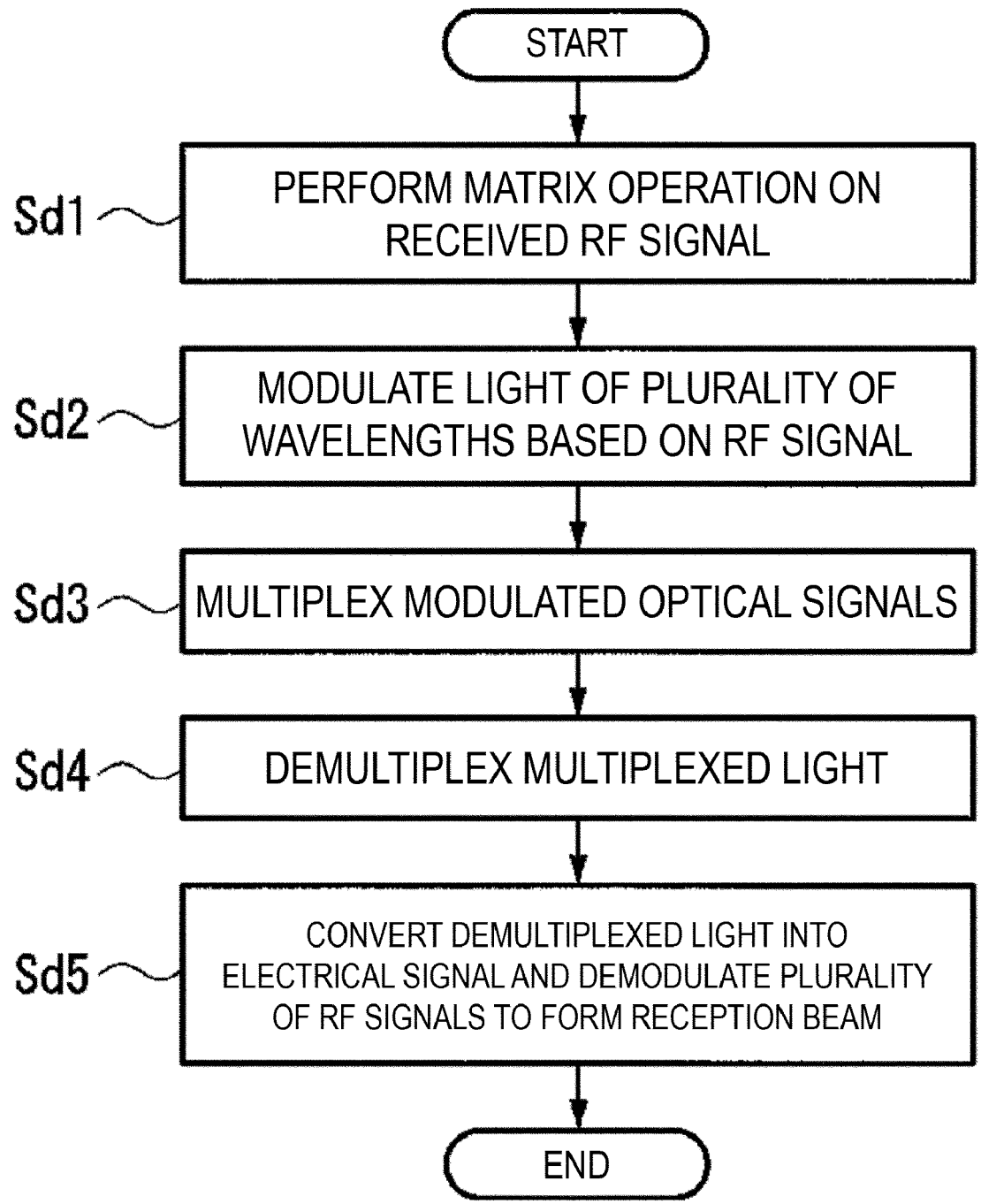
FIG. 16 is a flowchart illustrating a flow of processing performed by the wireless reception system according to the third embodiment.

Processing Performed by Wireless Reception System According to Fourth Embodiment FIG. 16 is a flowchart illustrating a flow of processing performed by the wireless reception system 90r2 according to the fourth embodiment.

It is assumed that the RF signal transmitted by each of the m transmission terminal apparatuses 9-2-1 to 9-2-m has arrived in each of directions of m reception beams 6-1 to 6-m. Then, n reception antennas 31-1 to 31-n output the received RF signals to the second ports Sp32-1 to Sp32-n of the matrix operation unit 32 connected to each of the reception antennas 31-1 to 31-n.

The matrix operation unit 32 performs an inverse operation of the BFN matrix operation on the RF signals received by the second port Sp32-1 to Sp32-n and outputs each of the RF signals obtained as a result of the operation from the first ports Fp32-1 to Fp32-m (Step Sd1).

Each of the optical modulators 33-1 to 33-n performs intensity modulation with the RF signals output by the matrix operation unit 32 from the first ports Fp32-1 to Fp32-m using the light of the wavelengths $\lambda_{R1}$ to $\lambda_{Rm}$ provided to each of the optical modulators 33-1 to 33-n from the optical demultiplexer 36 as an optical carrier and generates and outputs an optical signal (Step Sd2).

The optical multiplexer 34 multiplexes the m optical signals of the wavelengths $\lambda_{R1}$ to $\lambda_{Rm}$ output by each of the optical modulators 33-1 to 33-m and outputs the multiplexed optical signal to the upstream optical fiber 3-2 (Step Sd3). The upstream optical fiber 3-2 transmits the optical signal multiplexed by the optical multiplexer 34 to the optical demultiplexer 41 of the accommodation station reception unit 40m.

The optical demultiplexer 41 demultiplexes the optical signal received from the upstream optical fiber 3-2 into m wavelengths $\lambda_{R1}$ to $\lambda_{Rm}$. By the optical demultiplexer 41, each of the demultiplexed optical signals is branched and output to the output port corresponding to each wavelength (Step Sd4).

Each of the n O/E converters 45-1 to 45-m of the output unit 42c receives the optical signal output by the optical demultiplexer 41 from the output port, converts the received optical signal into an electrical signal, and demodulates and outputs the RF signal (Step Sd5). This means that reception beams 6-1 to 6-m are formed because the RF signals arriving in the directions of the reception beams 6-1 to 6-m have been subjected to same phase synthesis.

In the wireless reception system 90r2 according to the fourth embodiment described above, the base station reception unit 30 includes reception antennas 31-1 to 31-m, optical modulators 33-1 to 33-m, and an optical multiplexer 34, and the reception antennas 31-1 to 31-n receive RF signals with the reception beams 6-1 to 6-m. The matrix operation unit 32 includes first ports Fp32-1 to Fp32-m and second ports Sp32-1 to Sp32-n. Further, the matrix operation unit 32 uses each of the first ports Fp32-1 to Fp32-m as a reference port and performs, on signals obtained by the reference ports, a BFN matrix operation of making a phase change that is different for each of positions of the reference ports and cause each of phases of signals output from the second ports Sp32-1 to Sp32-n to have a linear inclination.

The reception antennas 31-1 to 31-n are connected to each of the second ports Sp32-1 to Sp32-n, and each of the second ports Sp32-1 to Sp32-n obtains the RF signals received with the reception beams 6-1 to 6-m. The optical modulators 33-1 to 33-m are connected to the first ports Fp32-1 to Fp32-m of the matrix operation unit 32, respectively, and light of different wavelengths $\lambda_{R1}$ to $\lambda_{Rm}$ is sent to each of the optical modulators 33-1 to 33-m. Then, the optical modulators 33-1 to 33-m modulate the sent light to generate optical signals based on the RF signal obtained through an inverse operation of the BFN matrix operation output by each of the first ports Fp32-1 to Fp32-m. The optical multiplexer 34 multiplexes optical signals generated by the optical modulators 3-1 to 33-m and outputs the multiplexed optical signal. The accommodation station reception unit 40m includes an optical demultiplexer 41 and an output unit 42c, and the optical demultiplexer 41 obtains the optical signal output by the optical multiplexer 34 and demultiplexes the optical signal for each wavelength. The output unit 42c includes O/E converters 45-1 to 45-, connected to outputs of the optical demultiplexer 41, and each of the O/E converters 45-1 to 45-m obtains the optical signals with mutually different wavelengths $\lambda_{R1}$ to $\lambda_{Rn}$ demultiplexed by the optical demultiplexer 41, converts the obtained optical signals into electrical signals to demodulate the RF signal, and outputs the demodulated RF signal.

In the wireless reception system 90r2 described above, each of the m wavelengths $\lambda_{R1}$ to $\lambda_{Rm}$ is correlated with each of the first ports Fp32-1 to Fp32-m of the matrix operation unit 32 by the optical multiplexer 34 and the optical demultiplexer 41 in a fixed manner. In other words, it can be said that each of the m wavelengths $\lambda_{R1}$ to $\lambda_{Rm}$ and each of them reception beams 6-1 to 6-m are correlated in a one-to-one relationship. Thus, the optical modulators 33-1 to 33-m of the base station reception unit 30 perform modulation with the RF signals output by the matrix operation unit 32 from the first ports Fp32-1 to Fp32-m using the light of the m wavelength $\lambda_{R1}$ to $\lambda_{Rm}$ as an optical carrier and generate m optical signals. The optical multiplexer 34 multiplexes the m optical signals and transmits the multiplexed optical signal to the accommodation station reception unit 40m, and the accommodation station reception unit 40m demultiplexes the optical signal for each wavelength and converts the demultiplexed optical signals into electrical signals, thereby demodulating and outputting the RF signal. In this manner, it is possible to form multi-beams, that is, the m reception beams 6-1 to 6-m corresponding to each RF signal in the wireless reception system 90r2.

Note that in a case in which an RF signal has arrived in a direction other than the directions of the reception beams 6-1 to 6-m in the wireless reception system 90r2 described above, each of the m first ports Fp32-1 to Fp32-m of the matrix operation unit 32 outputs an RF signal with an amplitude and a phase different from those of the original RF signal.

In this case, the RF signal with the different amplitude and the different phase is sent to each of the optical modulators 33-1 to 33-m. Each of the optical modulators 33-1 to 33-m generates optical signals of the wavelengths $\lambda_{R1}$ to $\lambda_{Rm}$ modulated with the RF signal sent to each of the optical modulators 33-1 to 33-m. From a different viewpoint, RF signals are separately superimposed on the optical signals of the plurality of wavelengths $\lambda_{R1}$ to $\lambda_{Rm}$. Thus, it is necessary for the output unit 42c of the accommodation station reception unit 40m to perform processing of demodulating the RF signal on the plurality of optical signals output by the optical demultiplexer 41 from the plurality of output ports as targets. For example, the output unit 42c of the accommodation station reception unit 40m performs electrical conversion on each of the optical signals demultiplexed and output by the optical demultiplexer 41 for each wavelength to demodulate the RF signal superimposed on each of the optical signal. The output unit 42c may select and output an RF signal with the highest power from among the demodulated RF signals or may perform MIMO signal processing on the plurality of demodulated RF signals and then provide an output.

In the wireless reception system 90r2 described above, the base station apparatus 1 is not required to perform any control. Further, information regarding the distance of the upstream optical fiber 3-2 is not needed, and the number of wavelengths to be used is limited to the number of first ports Fp32-1 to Fp32-m of the matrix operation unit 32. Further, a configuration of electrically shifting switches is also not included. It is thus possible to perform beam forming of transmission and reception antennas without using control of the base station apparatus and information regarding the distance of the optical fiber while curbing degradation of wavelength utilization efficiency and an increase in cost.

Figure 17:
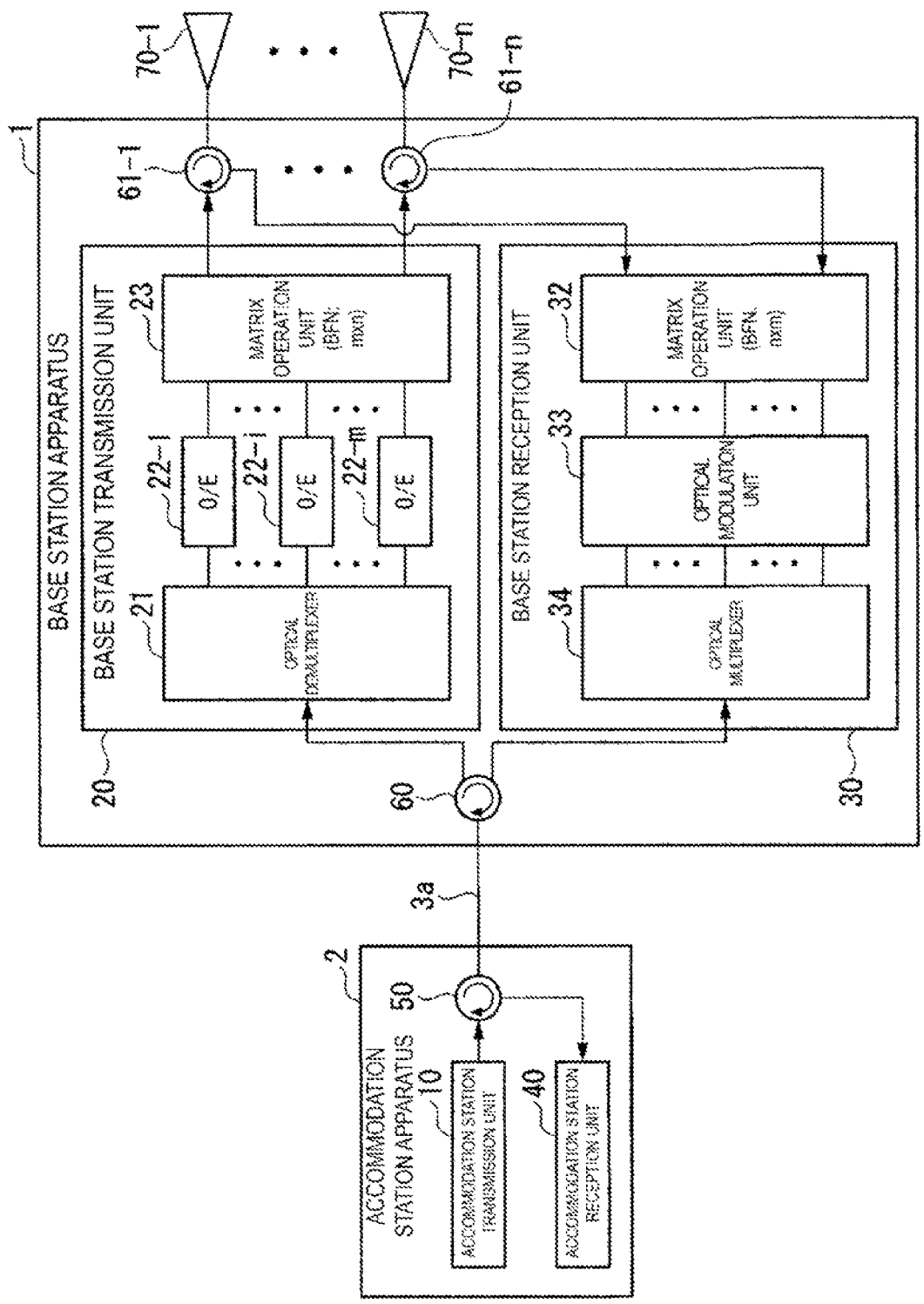
FIG. 17 is a diagram illustrating an example of a connection configuration between a base station apparatus and an accommodation station apparatus according to the first to fourth embodiments.
Figure 18:
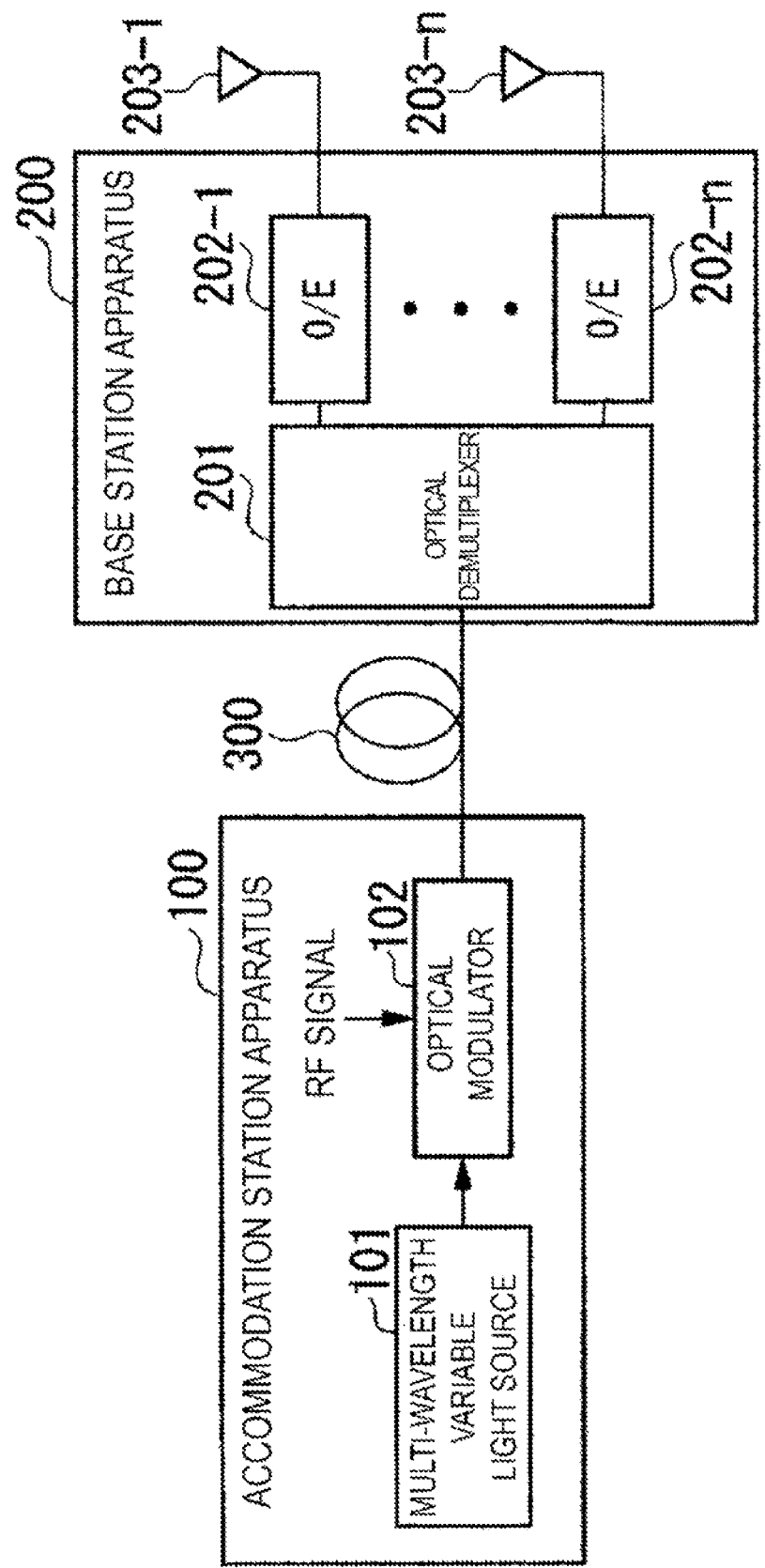
FIG. 18 is a block diagram illustrating a technique disclosed in PTL 1.
Figure 19:
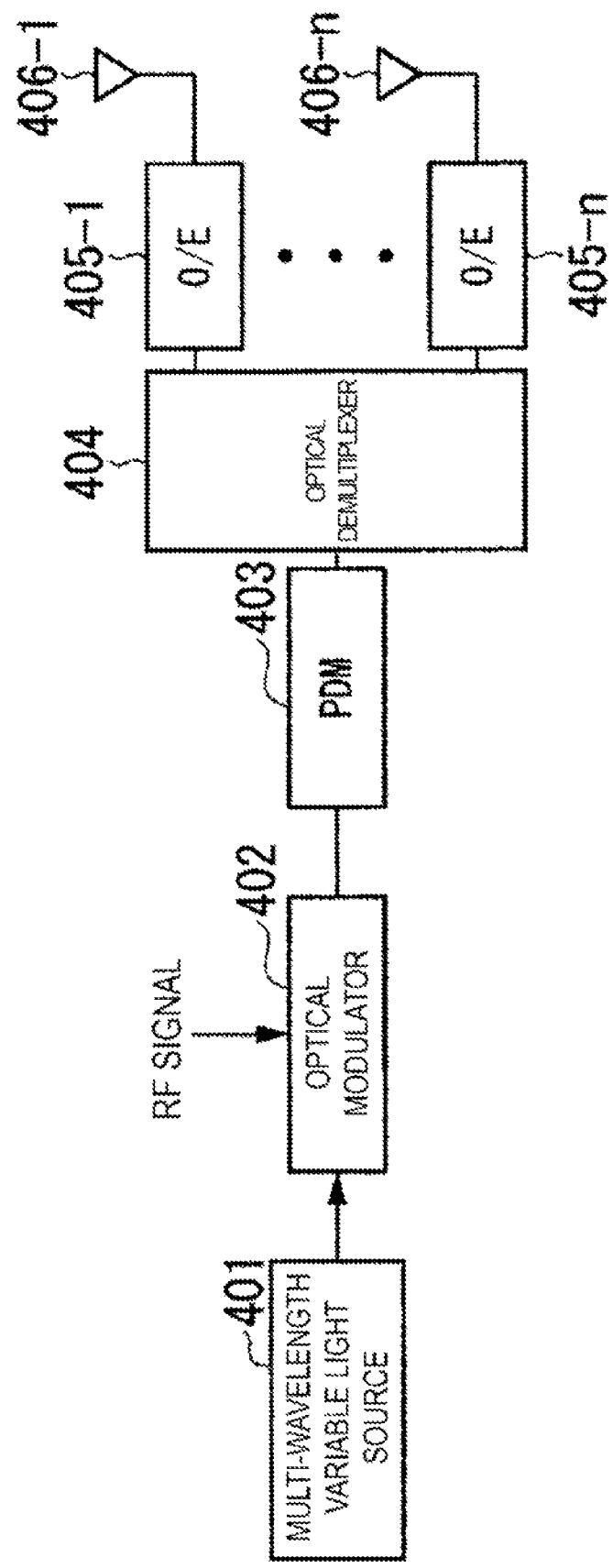
FIG. 19 is a block diagram (No. 1) illustrating a technique described in NPL 1.
Figure 20:
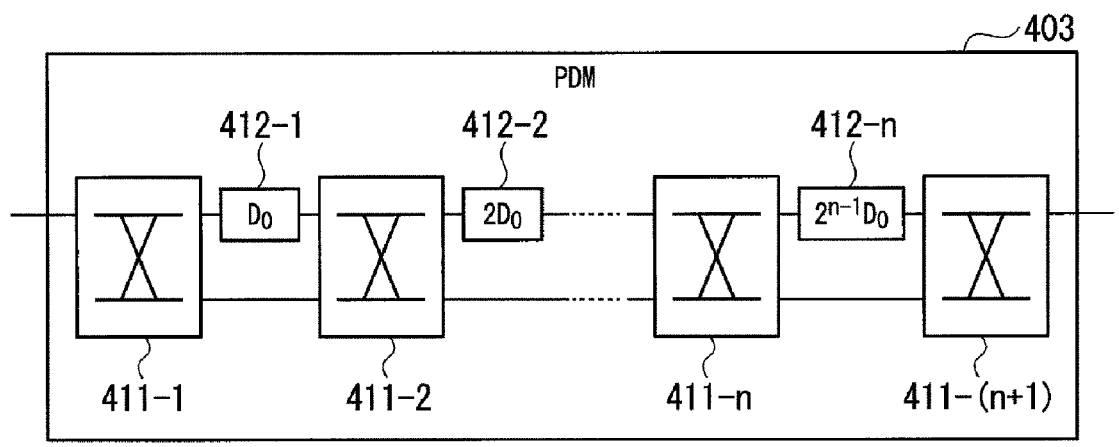
FIG. 20 is a block diagram (No. 2) illustrating the technique described in NPL 1.

Connection Configuration between Accommodation Station Apparatus and Base Station Apparatus The first to fourth embodiments described above may be configured to use circulators 50 and 60 as illustrated in FIG. 17, for example, although the embodiments are illustrated with the downstream optical fiber 3-1 and the upstream optical fiber 3-2 separated from each other on the assumption that the optical fiber 3 has two cores. FIG. 17 is a block diagram illustrating a configuration in which the accommodation station apparatus 2 and the base station apparatus 1 are connected with a one-core optical fiber 3a.

The circulator 50 includes three ports. The three ports included in the circulator 50 include a port connected to the accommodation station transmission unit 10, a port connected to the circulator 60 via the optical fiber 3a, and a port connected to the accommodation station reception unit 40. The circulator 50 receives the optical signal output by the accommodation station transmission unit 10, outputs the optical signal to the optical fiber 3a, receives the optical signal transmitted through the optical fiber 3a, and outputs the optical signal to the accommodation station reception unit 40. The circulator 60 similarly includes three ports. The three ports included in the circulator 60 include a port connected to the circulator 50 via the optical fiber 3a, a port connected to the base station transmission unit 20, and a port connected to the base station reception unit 30. The circulator 60 receives the optical signal transmitted through the optical fiber 3a, outputs the optical signal to the base station transmission unit 20, receives the optical signal output by the base station reception unit 30, and outputs the optical signal to the optical fiber 3a.

Further, the base station apparatus 1 is configured such that the base station transmission unit 20 includes the transmission antennas 24-1 to 24-n in the first and third embodiments while the base station reception unit 30 includes the reception antennas 31-1 to 31-n in the second and fourth embodiment. On the other hand, the base station apparatus 1 may include n circulators 61-1 to 61-n, and n antenna elements 70-1 to 70-n may be shared for transmission and reception as illustrated in FIG. 17. Each of the circulators 61-1 to 61-n outputs each of the RF signals output by the matrix operation unit 23 of the base station transmission unit 20 from each of the second ports Sp23-1 to Sp23-n to the antenna elements 70-1 to 70-n. Further, each of the circulators 61-1 to 61-n outputs the RF signals received and output by the antenna elements 70-1 to 70-n to each of the second ports Sp32-1 to Sp32-n of the matrix operation unit 32.

Note that in a case of a single mode in FIG. 17, the accommodation station transmission unit 10s is applied to the accommodation station transmission unit 10 and the accommodation station reception unit 40s is applied to the accommodation station reception unit 40. In a case of multi-mode, the accommodation station transmission unit 10m is applied to the accommodation station transmission unit 10, and the accommodation station reception unit 40m is applied to the accommodation station reception unit 40.

Although the first to fourth embodiments described above are described on the assumption that the wavelengths $\lambda_{T1}$ to $\lambda_{Tm}$ of the light transmitted through the downstream optical fiber 3-1 may be the same wavelengths as the wavelengths $\lambda_{R1}$ to $\lambda_{Rm}$ of the light transmitted through the upstream optical fiber 3-2, the optical fiber 3a is provided as a one core in the case of the configuration in FIG. 17, and it is thus necessary that the wavelengths $\lambda_{T1}$ to $\lambda_{Tm}$ be wavelengths different from the wavelengths $\lambda_{R1}$ to $\lambda_{Rm}$.

The transmission wavelength control units 12a and 12b and the reception wavelength control unit 43 according to the aforementioned embodiment may be realized by a computer. In this case, a program for realizing the functions may be recorded on a computer-readable recording medium and the program recorded on the recording medium may be read and executed by a computer system to achieve the functions. Note that the "computer system" as used herein includes an OS and hardware such as peripheral devices. In addition, the "computer-readable recording medium" refers to a portable medium such as a flexible disk, a magneto-optical disk, a ROM, or a CD-ROM, or a storage device such as a hard disk built into a computer system. Further, the "computer-readable recording medium" may also include such a medium that stores programs dynamically for a short period of time, one example of which is a communication line used when a program is transmitted via a network such as the Internet or a communication line such as a telephone line, and may also include such a medium that stores programs for a certain period of time, one example of which is a volatile memory inside a computer system that functions as a server or a client in the case. The above program may be a program for implementing a part of the aforementioned functions, may be a program capable of implementing the aforementioned functions in combination with another program that has already been recorded in the computer system, or may be a program to be implemented using a programmable logic device such as a field programmable gate array (FPGA).

Although the embodiments of the present invention have been described above in detail with reference to the drawings, specific configurations are not limited to the embodiments, and a design or the like in a range that does not depart from the gist of the present invention is also included.

INDUSTRIAL APPLICABILITY

The present invention can be used in a case in which beam forming is performed in a wireless communication system using RoF.

REFERENCE SIGNS LIST

90 Wireless communication system
1 Base station apparatus
2 Accommodation station apparatus
3 Optical fiber 9 Terminal apparatus
10 Accommodation station transmission unit
20 Base station transmission unit
30 Base station reception unit
40 Accommodation station reception unit

The invention claimed is:

1. A wireless transmission system comprising:
an accommodation station transmission unit configured to modulate light based on an RF signal to generate an optical signal and output the generated optical signal; and
a base station transmission unit configured to receive the optical signal output by the accommodation station transmission unit,
wherein the base station transmission unit includes:
an optical demultiplexer including a plurality of output ports assigned to a plurality of wavelengths of the light, the optical demultiplexer being configured to receive, from an input port, the optical signal output by the accommodation station transmission unit, demultiplex the received optical signal for each of the plurality of wavelengths, and output the demultiplexed optical signal from the output port corresponding to the wavelength,
a plurality of photoelectric converters, each of which is connected to each of the plurality of output ports of the optical demultiplexer, the plurality of photoelectric converters being configured to convert the optical signal output by the optical demultiplexer into an electrical signal to demodulate the RF signal and output the demodulated RF signal,
a matrix operation unit including a plurality of first ports and a plurality of second ports, the matrix operation unit being configured to perform, using each of the plurality of first ports as a reference port, on a plurality of signals received by a plurality of the reference ports, a BFN matrix operation of making a phase change that is different for a position of the reference port and the phase change that causes phases of signals output by the plurality of second ports to have a linear inclination, each of the plurality of first ports being connected to an output of each of the plurality of photoelectric converters to receive the RF signal output by each of the photoelectric converters connected to each of the plurality of first port, and
a plurality of transmission antennas, each of which is connected to each of the plurality of second ports of the matrix operation unit, the plurality of transmission antennas being configured to form a plurality of transmission beams in different directions for each of the wavelengths through emission of the RF signal output by each of the second ports after the BFN matrix operation.

2. The wireless transmission system according to claim 1, wherein the accommodation station transmission unit includes one optical modulator configured to modulate light of a single wavelength to generate and output the optical signal based on the RF signal, or the accommodation station transmission unit includes a plurality of optical modulators and an optical multiplexer, light of different wavelengths is provided to each of the plurality of optical modulators each of the plurality of optical modulators modulates the provided light to generate the optical signal based on the RF signal, and the optical multiplexer multiplexes a plurality of the optical signals generated by the plurality of optical modulators and outputs the multiplexed optical signals.

3. A wireless reception system comprising:
a base station reception unit; and
an accommodation station reception unit, wherein
the base station reception unit includes:
a plurality of reception antennas configured to form a plurality of reception beams using an arriving RF signal and receive the plurality of formed reception beams;
a matrix operation unit including a plurality of first ports and a plurality of second ports, the matrix operation unit being configured to use each of the plurality of first ports as a reference port and perform, on a plurality of signals obtained by a plurality of reference ports, a BFN matrix operation of making a phase change that is different depending on a position of the reference port and cause phases of a plurality of signals output from the plurality of second ports to have a linear inclination, the plurality of second ports being connected to the plurality of reception antennas and receiving the RF signal received and output by the plurality of reception antennas using the plurality of reception beams;
a plurality of optical modulators, each of which is connected to each of the plurality of first ports of the matrix operation unit to provide light of different wavelengths to each of the plurality of first ports, the optical modulator being configured to modulate the provided light to generate an optical signal based on the RF signal obtained through an inverse operation of the BFN matrix operation and output from each the plurality of the first ports; and
an optical multiplexer configured to multiplex the plurality of optical signals generated by the plurality of optical modulators and output the plurality of multiplexed optical signals; and
the accommodation station reception unit is configured to receive the optical signal output by the base station reception unit, and includes:
an optical demultiplexer configured to receive the optical signal output by the optical multiplexer included in the base station reception unit and demultiplex the optical signal for a wavelength, and
an output unit configured to convert the optical signal demultiplexed by the optical demultiplexer into an electrical signal to demodulate the RF signal and output the demodulated RF signal.

4. The wireless reception system according to claim 3, wherein the output unit includes a plurality of photoelectrical converters, the plurality of photoelectrical converters converts the optical signal of any one of wavelengths included in the optical signal output by the optical demultiplexer into an electrical signal to demodulate the RF signal, and outputs the demodulated RF signal, or the output unit includes a plurality of photoelectrical converters each of which is connected to an output of the optical demultiplexer, and each of the plurality of photoelectrical converters obtains a plurality of optical signals of different wavelengths demultiplexed by the optical demultiplexer, converts the obtained optical signals into electrical signals to demodulate the RF signals, and outputs the demodulated RF signals.

5. A wireless transmission method performed by a wireless transmission system including an accommodation station transmission unit and a base station transmission unit, the method comprising:
by the accommodation station transmission unit, modulating light to generate an optical signal based on an RF signal and outputting the generated optical signal;
by an optical demultiplexer included in the base station transmission unit, receiving the optical signal output by the accommodation station transmission unit from an input port, demultiplexing the received optical signal for a wavelength, and outputting the demultiplexed optical signal from, among a plurality of output ports assigned to a wavelength of the light, the output ports corresponding to the wavelength by each of a plurality of photoelectric converters included in the base station transmission unit being connected to each of the plurality of output ports of the optical demultiplexer, converting the optical signal output by the optical demultiplexer into an electrical signal to demodulate the RF signal and outputting the demodulated RF signal;

by a matrix operation unit included in the base station transmission unit including a plurality of first ports and a plurality of second ports, using each of the plurality of first ports as a reference port, performing, on a plurality of signals obtained by a plurality of reference ports, a BFN matrix operation of making a phase change that is different for a position of the reference port and the phase change that causes phases of signals output from the plurality of second ports to have a linear inclination, and by each of the plurality of first ports, receiving the RF signal output by the photoelectric converter connected to each of the plurality of first ports; and by a plurality of transmission antennas included in the base station transmission unit, forming transmission beams in different directions for each wavelengths through emission of the RF signal, output from each of the second ports of the matrix operation unit, after the BFN matrix operation.

* * * * *